United States Patent
Fort et al.

(10) Patent No.: US 10,439,822 B2
(45) Date of Patent: *Oct. 8, 2019

(54) MULTI-USER STRONG AUTHENTICATION TOKEN

(71) Applicant: ONESPAN NORTH AMERICA INC., Chicago, IL (US)

(72) Inventors: Nicolas Fort, Bordeaux (FR); Frederik Mennes, Strombeek-Bever (BE); Ludovic Joly, Langon (FR); Guillaume Teixeron, Le Bouscat (FR)

(73) Assignee: OneSpan North America Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,151

(22) Filed: Dec. 28, 2018

(65) Prior Publication Data

US 2019/0140839 A1    May 9, 2019

Related U.S. Application Data

(63) Continuation of application No. 15/271,768, filed on Sep. 21, 2016, now Pat. No. 10,171,246.

(Continued)

(51) Int. Cl.
| | |
|---|---|
| *H04L 29/06* | (2006.01) |
| *H04L 9/32* | (2006.01) |
| *G06Q 20/40* | (2012.01) |
| *G06F 3/0484* | (2013.01) |
| *G06F 3/0488* | (2013.01) |
| *G06F 21/42* | (2013.01) |

(Continued)

(52) U.S. Cl.
CPC ........... *H04L 9/3247* (2013.01); *G06F 3/0488* (2013.01); *G06F 3/04847* (2013.01); *G06F 21/42* (2013.01); *G06F 21/64* (2013.01); *G06F 21/84* (2013.01); *G06Q 20/401* (2013.01); *H04L 63/1466* (2013.01)

(58) Field of Classification Search
CPC . H04L 9/32; H04L 63/04; G06F 21/00; G06F 21/30
See application file for complete search history.

(56) References Cited

U.S. PATENT DOCUMENTS

| | | |
|---|---|---|
| 8,332,627 B1 | 12/2012 | Matthews et al. |
| 8,341,744 B1 | 12/2012 | Obrecht et al. |
| | (Continued) | |

FOREIGN PATENT DOCUMENTS

WO    2013043888 A1    3/2013

OTHER PUBLICATIONS

International Preliminary Report on Patentability for International Application No. PCT/US2015/052865, dated Mar. 27, 2018, 7 pages.

(Continued)

*Primary Examiner* — Izunna Okeke
(74) *Attorney, Agent, or Firm* — Culhane Meadows PLLC; Stephen J. Weed

(57) ABSTRACT

Apparatus, methods and systems to secure remotely accessible applications using authentication devices are disclosed. More in particular apparatus, methods and systems are disclosed for thwarting overlay attacks against authentication applications for displaying transaction data and for generating signatures over these transaction data.

23 Claims, 6 Drawing Sheets

Related U.S. Application Data

(60) Provisional application No. 62/221,343, filed on Sep. 21, 2015.

(51) Int. Cl.
    *G06F 21/64* (2013.01)
    *G06F 21/84* (2013.01)

(56) References Cited

U.S. PATENT DOCUMENTS

| | | | |
|---|---|---|---|
| 2010/0174653 A1* | 7/2010 | Tian | G06Q 20/04 705/71 |
| 2014/0041025 A1 | 2/2014 | Ur | |
| 2014/0189360 A1* | 7/2014 | Baghdasaryan | H04L 9/3247 713/176 |
| 2015/0188891 A1 | 7/2015 | Grange et al. | |

OTHER PUBLICATIONS

International Preliminary Report on Patentability for International Application No. PCT/US2016/052849, dated Mar. 27, 2018, 8 pages.
International Preliminary Report on Patentability for International Application No. PCT/US2018/052835, dated Mar. 27, 2018.
International Search Report and Written Opinion for PCT/US2016/052835 dated Dec. 6, 2016.
International Search Report and Written Opinion for PCT/US2016/052849 dated Dec. 6, 2016.
International Search Report and Written Opinion for PCT/US2016/052865 dated Dec. 6, 2016.

\* cited by examiner

MULTI-USER STRONG AUTHENTICATION TOKEN

CROSS REFERENCE TO RELATED APPLICATIONS

This application is a continuation of co-pending application U.S. Ser. No. 15/271,768 entitled A MULTI-USER STRONG AUTHENTICATION TOKEN filed on Sep. 21, 2016, which claims priority to U.S. Provisional Application Ser. No. 62/221,343 entitled A MULTI-USER STRONG AUTHENTICATION TOKEN, filed on Sep. 21, 2015, the contents of these applications are incorporated fully herein by reference.

FIELD OF THE INVENTION

The invention relates to securing remote access to computers and applications and remote transactions over computer networks. More specifically, the invention relates to methods and apparatus for countering a new type of attack against authentication applications on mobile devices such as smartphones.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data have not been altered before being received at an application server.

One way to secure access to remote applications is the use of an authentication application on a user's personal device such as a user's smartphone. In some cases, such an authentication application may be adapted to dynamically generate credentials. In some cases, these dynamic credentials may be presented to the user on the user's personal device, e.g. in the form of a string of alphanumerical characters, for the user to forward to the remote application that the user is accessing and that needs to be secured. Alternatively, the authentication application may send the generated dynamic credential directly (e.g. using an internet connection established by the user's personal device) to the remote application. Upon receipt of the dynamic credential the remote application may then verify the dynamic credential that it received from the user or the user's personal device and may grant access to the user on condition that the verification of the received dynamic credential was successful.

In some cases, the user intends to submit a transaction to the remote application. In such cases the remote application may require the user to generate with the authentication application on his or her personal device a dynamic credential and provide that dynamic credential to the remote application. The remote application may then verify the dynamic credential that it received from the user and may accept the transaction on condition that the verification of the received dynamic credential was successful.

If the dynamic credential is cryptographically linked to the transaction data that characterize the transaction, then the dynamic credential may also be referred to as a signature or transaction data signature.

In some cases, the authentication application may be adapted to obtain and present the transaction data to the user such that the user can verify these transaction data. In some cases, the authentication application may present the transaction data to the user and may request the user to approve the presented transaction data and may generate and display a dynamic credential or signature for these transaction data only if the user indeed approved the presented transaction data. In some cases, the authentication application may generate the dynamic credential without requiring an explicit approval and may for example present the transaction data for which it generated the dynamic credential along with the generated dynamic credential to the user so that the user may verify whether the transaction data are correct and may decide depending on that verification whether or not to forward the generated dynamic credential.

In some cases, the user may be accessing and interacting with a remote application using an access device. For example, the user may be using a computing device, such as a Personal Computer (PC) or laptop, connected over a network such as the internet to a remote server computer that may be hosting the remote application. The user may use the access device to submit a transaction to the remote application. In such a case, an attacker may try to interfere, for example by means of a man-in-the-middle or a man-in-the-browser attack (e.g. by using malware installed on the user's PC or laptop), and may try to substitute the data of the legitimate transaction intended by the user with other data of a fraudulent transaction. For example, if the user is accessing an internet banking application and submits a money transfer order, an attacker may try to substitute the intended destination account number by a fraudulent account number associated with the attacker.

To protect against such attacks, the remote application may send the transaction data that it received to an authentication device of the user that is different from the access device that the user is using for accessing the remote application. The authentication device may present to the user the transaction data that it received from the remote application so that the user can verify the data that the remote application has received. The authentication device may also generate and present to the user a dynamic credential that is associated or linked to the presented transaction data. The user may then forward this dynamic credential to the remote application as a proof of approval by the user of the transaction data.

If an attacker has substituted the real transaction data, which the legitimate user intended to submit to the remote application using the access device, by fraudulent data, then the remote application will receive these fraudulent data and send these fraudulent data to the user's authentication device. The authentication device will present these fraudulent data to the user for verification. Upon verification of the presented data, the user will notice the discrepancy between the presented data and the real data of the transaction that the user actually intended to submit to the remote application, and can either reject the fraudulent data (upon which the authentication device will not generate a corresponding dynamic credential) or (if the authentication device generates a credential in any case and presents the generated credential to the user together with the received transaction data) decide not to forward the generated credential. Either way, the remote application will not receive a credential that matches the fraudulent data and the fraudulent transaction will not be accepted. The attacker may anticipate this and may back-substitute the (fraudulent) confirmation data that the remote application sends to the user's authentication device with the legitimate data that the user submitted and expects to verify on the authentication device. However, if the dynamic credential is cryptographically linked to the transaction data (for example if the authentication device generates a cryptographic signature over the confirmation data that are received from the remote application and presented to the user), this will also be detected. More specifically, to verify the received credential the remote application will use in the verification process the fraudulent data that it originally received from the attacker (which the attacker submitted to the remote application instead of the data that the user intended to submit). However, in this case the dynamic credential would be cryptographically linked to the back-substituted data that the attacker provided to the user's authentication device instead of the confirmation data that the remote application intended to send to the authentication device, and the verification of the dynamic credential will fail.

In some cases, the user's authentication device may comprise a personal device associated with the user. In some cases, the user's authentication device may be a hardware device that is fully dedicated to providing the authentication and data signature functions as described above. In other cases, the user's authentication device may comprise a personal multifunctional device which among many other applications may also support an authentication application. A user's smartphone or tablet computer equipped with an authentication app may be an example of such a personal multifunctional device.

The discussion of the background to the invention herein is included to explain the context of the invention. This shall not be taken as an admission that any of the material discussed above was published, known or part of the common general knowledge at the priority date of this application.

DISCLOSURE OF THE INVENTION

Technical Problem

While the security solutions described above go a long way in thwarting various man-in-the-middle attacks, the security of this solution hinges on the assumption that the attacker cannot manipulate the authentication device so as to break the link between the actual representation by the authentication device to the user of the confirmation data received from the remote application on the one hand and the generation by the authentication device of the corresponding dynamic credential on the other hand. This is a reasonable assumption in the case of a dedicated hardware authentication device, but it is much more questionable in the case of a multipurpose computing device, such as a typical smartphone or tablet computer, that may have an open operating system that allows the user to install extra software to enrich the functionality of the device.

In the latter case it is conceivable that an attacker may succeed in installing some kind of malware on the user's authentication device such that the data which the user actually gets to see for verification on the authentication device are different from the confirmation data that the authentication application on the authentication device received from the remote application and that the authentication device uses to generate a dynamic credential. In that case it may be possible that the attacker may succeed in making the user believe that the transaction data as known to the remote application do indeed correspond to the transaction that the user originally intended to submit while the authentication application is actually processing the fraudulent transaction data which the remote application has really received and has sent as confirmation data to the authentication device.

For example, on some smartphone or tablet platforms it may be possible to mount the following attack, which may be referred to as 'an overlay attack'. When the authentication application on the user's authentication device presents the authentication data to the user for verification, for example in a window of the authentication application, then a piece of malware may immediately put a malware window on top of the area of the authentication window that is used to present the transaction data to be verified/confirmed by the user, such that the real confirmation data presented by the authentication application are hidden and not visible to the user and such that the user instead gets to see the data presented in the malware window, i.e. the original transaction data that the user expects to see. If the attack is carefully executed, it may not be possible for the user to notice this type of attack. This type of attach may be referred to as an overlay attack and the malware window that is put on top of the authentication window may be referred to as the overlay window.

What is needed are solutions for thwarting such an overlay attack.

Technical Solution

The invention aims to ensure that the authentication device's display and/or input interface are managed in such a way that an overlay attack cannot be carried out, or that the user is unambiguously alerted to the presence of an overlay attack by visual indicia, thus making it impossible or at least more difficult to mount an overlay attack as described above completely or without the user at least noticing that something is wrong.

In a first set of embodiments an authentication application on the authentication device may be adapted to make an overlay attack actively impossible. In some embodiments the authentication application may be adapted to detect whether the authentication application window is obscured by another window and may be adapted to take appropriate measures if it detects that the authentication application window is obscured by another window. In some embodiments the authentication application may be adapted to force windows that include information generated by the authentication application for display to a user to always be on top such that the information can never be obscured by an overlay window. The authentication application may do that by calling one or more appropriate operating systems of the operating system of the computing device that the authentication application is running on. For example, in some embodiments the authentication device may comprise an electronic apparatus such as electronic consumer device (e.g. a smartphone or tablet computer). The authentication device may be running an operating system (e.g. Android or iOS) and the authentication application may comprise a piece of software that may be installed on the authentication device and that may be stored in the authentication device's memory and executed by the authentication device's microprocessor. In some embodiments the authentication application on the authentication device may call one or more functions from the operating system that allow the authentication application to determine whether or not the authentication application window is being obscured by another window. In some embodiments the authentication application on the authentication device may call one or more functions from the operating system that will bar the authentication application from receiving user inputs if the authentication application window is being obscured by another window.

The terminology 'calling a function from the operating system' as used herein may include setting the value of an attribute that influences the interaction of the application and the operating system.

In a second set of embodiments the authentication application may be adapted such that the presence of an overlay will automatically make it impossible for the user to obtain a dynamic credential. In some embodiments this may be achieved without the authentication application actually detecting the presence of an overlay window. For example, in some embodiments the authentication application may have, apart from the functionality of presenting to the user the transaction data and generating a corresponding dynamic credential, also other functionality that is indispensable for the user to obtain the dynamic credential (e.g. the function of presenting to the user a dynamic credential or a function to obtain from the user an indication of approval of the presented transaction data). In some embodiments the presentation to the user of the transaction data by the authentication data may be intertwined with this other functionality, that is indispensable for the user to obtain the dynamic credential, in such a way that the presence of an overlay window that hides the authentication data presented by the authentication application will inevitably interfere with this other functionality so as to automatically prevent this other functionality from being operable and achieving its purpose.

In a third set of embodiments the authentication application may be adapted such that the presence of an overlay window will automatically cause a visual anomaly which in turn has the effect of providing an unambiguous indication to the user of the presence of the overlay window. For example, such a visual anomaly may comprise a discontinuity in the background (such as a particular visual pattern) of the authentication window at the border of an overlay window. The presence of such an obvious and unexpected discontinuity will inevitably alert the user to the presence of the overlay window.

More details of these various embodiments are provided in the paragraphs below.

Detecting whether the transaction data presentation area may be obscured.

In some embodiments the authentication application may be adapted to detect whether the authentication application's transaction data presentation area, i.e., the authentication application window or the authentication application display area or the area of the display that the authentication application uses to display the transaction data, is or appears to be partially or entirely obscured for example by a window of some other application. If the transaction data presentation area (the authentication application window or the authentication application display area or the area of the display that the authentication application uses to display the transaction data) is obscured by some other window, then this may be a sign that the authentication application is being targeted by an overlay attack. In some embodiments the authentication application may be adapted to take measures that may thwart an overlay attack if the authentication application detects that the authentication application window or the authentication application display area or the area of the display that the authentication application uses to display the transaction data is partially or entirely obscured by some other window of some other application. In some embodiments the authentication application may be adapted to enter a safe mode instead of its normal operation mode if the authentication application detects that the authentication application window or the authentication application display area or the area of the display that the authentication application uses to display the transaction data is partially or entirely obscured by some other window of some other application.

For example, in some embodiments the authentication application may be adapted to generate a dynamic credential (such as a signature) for transaction data that it has received or obtained. In normal operation mode the authentication application may display the generated dynamic credential at the same time as the transaction data. However, if the authentication application detects that its transaction data presentation area, i.e., its own window or display area or more specifically the area that it uses for displaying the transaction data, is or appears to be partially or entirely obscured, the authentication application may enter a safe mode in which the authentication application may not start or may stop displaying the dynamic credential that it has generated.

In some embodiments the authentication may be adapted to generate and/or display a dynamic credential for a set of transaction data only after the authentication application has displayed the transaction data to the user for review and has received an indication of approval by the user of the displayed transaction data. In some embodiments the authentication application may offer the user in its normal operation mode a mechanism for indicating such approval. For example, in some embodiments the authentication application may offer the user in the authentication application's normal operation mode the possibility to indicate approval of the transaction data by touching an OK button of the authentication application. In some embodiments, if the authentication application detects that its own window or display area or more specifically the area that it uses for displaying the transaction data is or appears to be partially or entirely obscured, the authentication application may enter a safe mode in which the authentication application may disable the mechanism by which the user can approve the transaction data or in which the authentication application may ignore or refuse the approval of the user.

In some embodiments, the authentication application may call one or more functions of the operating system (or set an attribute value that will be used by the operating system) such that if the authentication application window is entirely or partially obscured by some other window, then the operating system will not pass certain user inputs to the authentication application. For example, in some embodiments the authentication application may display to the user the transaction data for review and may also provide an OK button for the user to touch to indicate the user's approval of the transaction data displayed by the authentication application. If the user has touched the OK button the authentication application may generate and display a dynamic credential that corresponds to the transaction data. In some embodiments the authentication application may call one or more functions of the operating system (or set an attribute value that will be used by the operating system) such that if the authentication application window is entirely or partially obscured by some other window, then any touches of the OK button will be discarded or will not be passed to the authentication application. For example, an authentication application running on an Android 2.3 or higher operating system may set the attribute 'filterTouchesWhenObscured' of Android's View class. This way the authentication application will discard touches whenever the authentication window is obscured by another window.

In some embodiments the authentication application may be adapted to detect whether its transaction data presentation area is (or is likely or appears to be) entirely or partially obscured by, for example, another window. In some embodiments the authentication application may verify whether its transaction data presentation area is (or is likely or appears to be) entirely or partially obscured, and may do this verification for example by making a call to one or more appropriate functions of the operating system of the apparatus on which the authentication application is running. In such cases, if the authentication application indeed concludes that its transaction data presentation area is (or is likely or appears to be) entirely or partially obscured, the authentication application may be adapted to not accept an approval by the user of the presented transaction data, or to make it impossible for the user to accept the presented transaction data (for example by disabling an OK button), or to not display a dynamic credential that it may have generated for the transaction data and that it normally would present to the user together with the transaction data. In the case where an OK button is normally used to allow the user to indicate approval of the transaction, the said disabling of the approval mechanism may comprise rendering the OK button unresponsive and displaying it in a "greyed out" (inactivated) rendering, thus providing an unambiguous visual indication of the presence of an anomaly (a possible attempted overlay attack) in addition to actively rendering the attempted attack ineffective.

In some embodiments, after the authentication application has detected that the transaction data presentation area no longer seems to be entirely or partially obscured, the authentication application may return from the safe mode to its normal operation mode, i.e. it may operate again as if no obscuration had taken place. In some embodiments the authentication application may be adapted to revert to its normal operation mode only after some delay during which the authentication application doesn't detect any obscuration. This delay may for example be 5 or 10 seconds. The delay may in general have a duration between 1 and 30 seconds. In some embodiments the authentication application may be adapted such that if during or after the delay period the authentication application detects that obscuration is again taking place then the authentication application may go into safe mode again. The effect of applying such a delay before the authentication application reverts from safe mode to normal operation mode after the authentication application has detected that an obscuration is no longer present, is that it is a countermeasure against an overlay attack which would refrain from overlaying the authentication application's transaction data presentation area for a very brief time (just long enough for the authentication application to revert to normal operation mode again).

Detecting whether the transaction data presentation area is not obscured.

In some embodiments the authentication application may be by default in a safe mode and be adapted to detect if the authentication application window or the authentication application display area or the area of the display that the authentication application uses to display the transaction data is not obscured and may be adapted to switch from safe mode to the normal operation mode after it has detected that the authentication application window or the authentication application display area or the area of the display that the authentication application uses to display the transaction data is not obscured.

In some embodiments the authentication application may be running on an authentication device such as smartphone or a tablet computer. In some embodiments the authentication device may have an operating system such as for example Android or iOS. In some embodiments the operating system of the authentication device that the authentication application is running on may support an operating system function that allows the authentication application to check or detect whether the authentication application window or the authentication application display area or the area of the display that the authentication application uses to display the transaction data is obscured or not obscured and the authentication application may be adapted to use that operating system function to detect whether the authentication application window or the authentication application display area or the area of the display that the authentication application uses to display the transaction data is obscured or not obscured and the authentication application may be adapted to use that information as explained above.

Forcing top position of the transaction data presentation area.

In some embodiments the operating system of the authentication device that the authentication application is running on may support an operating system function that allows the authentication application to force that the window of the authentication application that the authentication application uses for displaying the transaction data is on top and the authentication application may be adapted to use that operating system function to force that the window of the authentication application that the authentication application uses for displaying the transaction data is on top while the transaction data are being displayed such that the authentication application window cannot be overlaid by another window while the authentication application displays the transaction data.

Intertwining transaction data presentation and credential presentation.

In some embodiments the authentication application may present the transaction data to the user together with a dynamic credential that the authentication application may have generated for these transaction data. In some embodiments the authentication application may present the transaction data and the dynamic credential together to the user in such a way that it is very difficult or impossible for an overlay attack to isolate the presentation of the transaction data from the presentation of the corresponding generated dynamic credential, so that it is in turn very difficult or impossible for an overlay attack to hide or obscure the (fraudulent) transaction data that the authentication application may have received and used in the generation of the dynamic credential and tries to present to the user, by of the overlay attack presenting other transaction data, i.e. the data that the user expects and that the overlay attack wants to present to the user to deceive the user, with the goal of making the user believe that the correct transaction data have been used by the authentication application to generate the dynamic credential. For example, in some embodiments the authentication application may present the transaction data and the generated dynamic credential such that they occupy the same area of the display. In some embodiments the authentication application may for example present the transaction data and the generated dynamic credential in such a way that they appear to the user in an overlapping way or as stacked on top of each other. In some embodiments the authentication application may for example present the transaction data and the generated dynamic credential in such a way that the dynamic credential appears somewhere between the transaction data. In some embodiments the position of the presented dynamic credential with respect to the position of the presented transaction authentication data may vary from one session to another and/or from one authentication application instance or token to another, preferably in an unpredictable way. In some embodiments the authentication application may present the authentication data and the dynamic credential together, for example in an overlapping or interwoven way, but preferably in such a way that the user can easily distinguish the transaction data from the dynamic credential. For example, the authentication application may present the digits or characters representing the transaction data in a different way than the digits or characters representing the dynamic credential. For example, the authentication application may use a different font type, font size, and/or a font colour for the digits or characters representing the transaction data than for the digits or characters representing the dynamic credential. In one embodiment, the characteristics of the font or fonts used for the transaction data and/or for the dynamic credential may be chosen by the authentication application. In another embodiment, the characteristics of these fonts may be chosen by the user, e.g., via a user input. The font characteristics may be stored in memory, e.g., in a secure location accessible only by the authentication application.

Dynamic element with different evolution between transaction data and credential.

In some embodiments an aspect of the presentation of the transaction data and/or the generated credential may vary in time. In some embodiments the time-dependent varying of this aspect may be such that it highlights the difference between the transaction data and the generated credential that are being displayed. In some embodiments the authentication application may vary this aspect in a gradual or continuous manner. In some embodiments the authentication application may vary this aspect in an abrupt or discontinuous way. In some embodiments the authentication application may vary this aspect in an unpredictable way. For example, in some embodiments the characteristics of the fonts that the authentication application may use for displaying the transaction data and the generated dynamic credential may change in time. For example, the font size or the font colour may change with time. In some embodiments the authentication application may change the characteristics of the font or fonts used for displaying the generated dynamic credential independently of the characteristics of the font or fonts used for displaying the transaction data. In some embodiments the authentication may vary in time the relative position of the transaction data and the generated dynamic credential with respect to another and/or with respect to the authentication application's display window. In some embodiments, the font characteristics may be based on user selections.

Requiring active user interaction to make or keep a generated credential visible In some embodiments the authentication application may generate a dynamic credential for some transaction data and may display to the user the transaction data for which it has generated the dynamic credential. The authentication application may be adapted such that it will display to the user the dynamic credential if the user interacts with the authentication application in a particular way. For example, in some embodiments the authentication application may be running on a computing platform, such as for example a smartphone or a tablet computer, that comprises a touch screen and the authentication application may generate a dynamic credential and display the corresponding transaction data and the user may have to touch the area displaying the transaction data and make a swiping move to slide away the transaction data to make the generated dynamic credential visible. For example, in some embodiments the authentication application may display the transaction data on a representation of a door or curtain, for example, which the user must open or move out of the way by touching the transaction data and sliding it aside whereupon the generated dynamic credential may appear behind the door or curtain that is being opened or slid away. For example, in some embodiments the area or pane displaying the transaction data may have two parts or two halves and the user must touch each part or half with a finger and move/slide his or her two fingers apart to move the two parts or halves of the transaction data displaying area apart so that the generated dynamic credential which was seemingly hiding behind the transaction data pane becomes visible. In some embodiments the authentication application and the computing platform running the authentication application may be adapted so that the authentication application can only receive such user touch interactions if the authentication application is not being hidden or obscured by another window of another application. This may ensure that if the transaction data pane is being overlaid by another window then the user is unable to interact with the authentication application so that the authentication application will not divulge the generated dynamic credential to the user.

Making the presence of an overlay visible to the user.

In some embodiments the authentication application may be adapted to display the transaction data in a way that makes it hard for the malware application to provide an overlay that matches the area of the authentication window that displays the transaction data. If the overlay window doesn't match the area of the authentication window that displays the transaction data then this will cause an anomaly in the overall visual aspect of the authentication application window that the user expects so that the user will be alerted to the presence of the overlay window and conclude that it is not safe to proceed, e.g. with forwarding to the remote application the dynamic credential that is generated and displayed by the authentication application.

Variability of the transaction data presentation area

For example, in some embodiments the authentication application may be adapted such that the area of the authentication window that displays the transaction data may have a visually perceptible characteristic such as its position, dimensions and/or shape that may be variable from one transaction to another, preferably in an unpredictable way. In some embodiments the area of the authentication window that displays the transaction data may have a visually perceptible characteristic such as its position, dimensions and/or shape that may be variable, preferably in an unpredictable way, from one authentication apparatus or authentication application instance to another authentication apparatus or authentication application instance. This variability of the visually perceptible characteristic such as the position, dimensions and/or shape of the authentication window that displays the transaction data increases the probability that the malware overlay window doesn't match the area of the authentication window that displays the transaction data and either hides too much or not enough so that the user is given the opportunity to detect an unambiguous visual clue indicative of the fact that something is wrong.

In some embodiments the position, dimensions and/or shape of the authentication application's transaction data presentation area may change dynamically in an unpredictable way during the presentation of the data for a given transaction on a given authentication apparatus or authentication app instance. This makes an overlay attack much harder to implement since the malware that generates the overlay window, to avoid being detected by the user, must somehow continuously and in real time track the ever changing position, dimensions and/or shape of the authentication application's transaction data presentation area and adapt the corresponding overlay's position, dimensions and/or shape accordingly, since otherwise the user will have the opportunity to detect an unambiguous visual clue indicative of the presence of the overlay window.

Personalization of the transaction data presentation area.

In some embodiments the look and feel of the transaction data presentation area may be different, preferably in an unpredictable way, from one authentication device to another based on parameters that are managed locally by the authentication application and that preferably are not accessible to any other application. If the malware overlay window presents another look and feel than what the user expects (based on the experience of the user with the particular look and feel of the authentication application instance on the user's authentication device), then this may alert the user that something is wrong. For example, in some embodiments the font type, font size and/or font colour to present the transaction data may vary from one authentication device to another. In other embodiments the transaction data may be displayed against a highly personalized background, such as for example an individualized easily recognizable complicated drawing or a photo, which users in some embodiments may have chosen themselves, e.g., via a user input, and the user input selection may be stored in memory. If this background is different (preferably in an unpredictable way) for different authentication devices, then it is unlikely for a malware application to be able to present an overlay window with the same background that the user has come to expect from the real authentication application.

Continuity between the transaction data presentation area and the surroundings.

In some embodiments the transaction data presentation area is only a part of the full authentication application window and it may not be possible for the overlay window to cover the entire authentication window lest the user will no longer be able to get a seemingly normal user experience of the authentication application. In some embodiments the authentication application has an area that must remain visible and/or accessible to the user for to user to be able to see or obtain the dynamic credential. For example, in some embodiments the authentication application window might present the transaction data and the corresponding dynamic credential at the same time. In that case the overlay window cannot cover the presentation of the dynamic credential since otherwise the user would not be able to copy and forward the credential to the remote application which in turn would defeat the purpose of the malware. In another example, the authentication window may have a button for the user to press to approve or confirm the transaction data presented by the authentication application whereby the authentication application may be adapted to only generate and/or display the dynamic credential corresponding to the displayed transaction data if the user indeed approved the transaction data by pressing the button. Also in this case the overlay window cannot cover the approval button since otherwise the user would not be able to indicate his or her approval and no dynamic credential would be generated.

In some embodiments the authentication application may take advantage of this need to not overlay at least a part of the authentication window by creating a visual continuity between the transaction data presentation area of the authentication window (which would be hidden by the overlay window) and the area of the authentication window that would necessarily not be covered by the overlay window, whereby the presence of an overlay window would necessarily or likely disrupt this visual continuity or cause a visual discontinuity that would be readily detected by the user and would indicate to the user that something is wrong. For an overlay attack to have a reasonable probability of not being detected by the user, it should prevent at all times that such a visual discontinuity arises. A number of solutions are described below for an authentication application to make it more difficult for an overlay attack to prevent such a discontinuity to arise.

For example, in some embodiments the authentication application may apply a visually perceptible characteristic, such as a visually perceptible pattern, to the authentication window, whereby the presence of an overlay window that only partially covers the authentication window would inevitably or likely interfere with this visually perceptible characteristic in such a way that the presence of the overlay window would cause a visual disruption or discontinuity that would be noticeable to the user and would be recognised by the user as an anomaly. Such a visually perceptible characteristic may be static or may be dynamic, i.e. in some embodiments this visually perceptible characteristic may vary or evolve as a function of the time. In some embodiments this visually perceptible characteristic may vary from one authentication application instance to another. In some embodiments this visually perceptible characteristic may vary from one transaction authentication session to another. For example, in some embodiments the authentication application may display the transaction data on top of a background. In some embodiments the background may for example have a visual pattern that in the eyes of the user has a certain regularity or order while at the same time having some particular characteristic to distinguish it from other possible backgrounds. The background may extend beyond the area reserved for displaying the transaction data and may extend into other areas. More in particular the background may extend into an area that for example comprises a button for the user to confirm the displayed transaction data, or the background may extend into an area of the display that the authentication app may use for displaying a dynamic credential that the authentication app may have generated for the displayed transaction data such as a signature that the authentication app has generated over the displayed transaction data. The presence of a discontinuity in the pattern gives the user the opportunity to detect an unambiguous visual clue indicative of the presence of the overlay window. The pattern itself may preferably be such that a user notices any discontinuity in the pattern caused by for example a window overlaying the area displaying the transaction data as easily as possible.

In some embodiments the background may simply be colored in a particular shade of color. In some embodiments the coloring of the background may have a regular gradient (e.g. gradually shifting in a regular fashion from one color at one end of the background to another color at another end of the background).

In some embodiments the pattern may comprise a regular or semi-regular tiling of the plane. In some embodiments the pattern may for example comprise a spiral.

In other embodiments the background may, rather than displaying a regular or semi-regular pattern, display a picture which can be recognized by the user or which may be meaningful for the user. For example, in some embodiments the background may comprise the picture of a landscape or a face.

In some embodiments the background that the authentication application uses may be variable and may be unpredictable. In some embodiments the background that is used by the authentication application may vary from one authentication apparatus to another or from one authentication app instance to another authentication app instance. In some embodiments the background that a particular authentication app or authentication apparatus uses may vary from one authentication session to another authentication session. For example, in some embodiments an authentication app may use a different tiling pattern and/or different colors at every authentication session. In some embodiments each different authentication app instance or authentication apparatus may be configured with its own individual picture to use as a background. In some embodiments this picture may be chosen by the user. For example, the user may select a particular background or multiple backgrounds using an input interface and the user selection may be stored in memory.

In some embodiments the background that a particular authentication application uses for a particular authentication session may vary in time, i.e. the background may have a temporal variability. For example, in some embodiments some of the visually perceptible characteristics of the background that is being used by the authentication application may evolve during the time that the authentication application displays the transaction data to the user. In some embodiments the authentication application may change the background abruptly. In some embodiments the authentication application may change the background gradually.

In some embodiments the authentication application may change the colors that are used for the background.

In some embodiments the authentication application may change a pattern that is used for the background. For example, in some embodiments the background may comprise a periodic tiling pattern whereby the shape of the tiles may change in time. For example, the size of the tiles may change, or the angles of the tiles may change.

In some embodiments the authentication application may move the background while it displays the transaction data. For example, it may shift and/or rotate the background.

In some embodiments the authentication application may distort the background so that it changes in time. The distortion that the authentication application applies to the background may have a visually perceptible pattern that may be discerned by the user and this pattern may evolve in time in a way that may be perceived by the user. For example, in some embodiments the authentication application may let a distortion wave or ripple (for example a compression and/or dilation wave or ripple) move through the background. In some embodiments such a distortion wave may be a linear wave moving from one end to another end of the background. In some embodiments the distortion wave may be radially centred on an origin which may or may not be located inside the authentication window. Preferably the distortion happens both in the part of the background that would be obscured by the overlay window and the part of the background of the authentication window that would not be obscured by the overlay window such that the boundary of the overlay window would cut across the distortion pattern which in turn means that a user can unambiguously detect a visual clue indicative of the presence of an overlay window if that overlay window is not capable of emulating not only the same background as the authentication application but also the same distortion as the authentication application.

In some embodiments the authentication application may divide the background in lanes (which may be horizontal, vertical or slanted) and each lane may evolve separately. For example, the part of the background in each lane may move with a different speed or even in a different direction. Also, the movement of each lane may change independent from the movement in the other lanes. In some embodiments the authentication application may choose the orientation of the lanes such that there is always at least one lane which will be in the background of both the transaction data presentation area of the authentication window (which would be hidden by an overlay window) and the area of the authentication window that would necessarily not be covered by the overlay window. This ensures that the presence of an overlay window would necessarily cause a discontinuity in at least that lane such that the user may be alerted to the presence of the overlay window.

In some embodiments the characteristics of the temporal change itself may be variable. These characteristics of the temporal change itself may vary for example from one authentication apparatus or authentication application instance to another, and/or from one authentication session to another authentication session, and/or during a particular authentication session on a particular authentication apparatus or authentication application instance. For example, in some embodiments the background may move and the parameters of the movement of the background may be variable. Parameters of the movement may include whether the movement comprises a translation or a rotation, the direction of translation or rotation, the centre of rotation, the speed of the translation and/or rotation. In some embodiments the background may be distorted in time and the parameters of the distortion may be variable. For example, the speed, size or amplitude or direction of the distortion may be variable, or the speed, size or amplitude, wave length or direction of a wave or ripple may be variable.

All this variability, and more specifically the unpredictability of this variability, of the background that the authentication application is using makes it significantly more difficult for an overlay attack to figure out which pattern the background may be having at any given time so that it is hard or even impossible for the overlay window to adapt its own background in real time so that the background of the overlay window seamlessly matches the parts of the background of the authentication window that are not obscured by the overlay window.

Combining solutions

In some embodiments two or more of the above described solutions may be combined.

Receiving transaction data

In some embodiments the authentication device that is running the authentication application may comprise a data input interface adapted to receive transaction data. In some embodiments the authentication application may be adapted to use this data input interface to obtain the transaction data and to use the thus obtained transaction data as described elsewhere in this application, e.g. to display the obtained transaction data to the user and/or to generate a dynamic credential corresponding to the obtained transaction data.

For example, in some embodiments an access device that a user is using to access a remote application may display a 2D image that includes encoded transaction data and the authentication device may comprise a camera and the authentication application may be adapted to use this camera to take a picture of the 2D image displayed on the display of the access device and decode the 2D image and retrieve the encoded transaction data for use as described elsewhere in this application.

In some embodiments an access device that a user is using to access a remote application may display a sequence of 2D images that include encoded transaction data and the authentication device may comprise a camera and the authentication application may be adapted to use this camera to make a movie or a series of pictures of the series of 2D images displayed on the display of the access device and decode the captured series of 2D images and retrieve the encoded transaction data for use as described elsewhere in this application.

In some embodiments an access device that a user is using to access a remote application may display a clip or movie that encodes transaction data and the authentication device may comprise a camera and the authentication application may be adapted to use this camera to film the movie or clip displayed on the display of the access device and decode the filmed movie or clip and retrieve the encoded transaction data for use as described elsewhere in this application.

For example, in some embodiments the device may have a wireless data communication interface (such as for example a 3G or 4G wireless data interface on for example a smartphone or a tablet computer) and the authentication application may be adapted to receive, using this wireless data communication interface, a message that contains transaction data and decode the message and retrieve the encoded transaction data for use as described elsewhere in this application.

Generating dynamic credentials

In some embodiments the authentication application may be adapted to generate dynamic credentials by cryptographically combining a dynamic variable with a cryptographic secret. In some embodiments the authentication application may be adapted to generate dynamic credentials by cryptographically combining a dynamic variable with a cryptographic secret comprising one or more credential generation keys that are associated with an instance of the authentication application. In some embodiments the credential generation keys may be part of the data associated with the instance. In some embodiments the authentication application determines the values of the credential generation keys by using data associated with the instance. The dynamic variable may comprise a value internally generated by the token such as for example the value of a real-time clock (for example a clock of the computing platform that the authentication application is running on), or the value of an event related variable that may be part of the data associated with the authentication application instance and automatically updated as a function of the current value such as for example a counter that may be incremented (or decremented) by the authentication application instance each time a dynamic credential is generated using the value of that counter, or the value of a dynamic credential previously generated by the authentication application instance and stored as part of the data associated with the instance. The dynamic variable may also comprise an externally generated value that is received by the authentication application instance, such as a challenge generated by an application server or transaction data that needs to be signed and that have been provided to the token as described above. A dynamic variable may also comprise any combination of internally and externally generated values. For example, in order to prevent replay attacks against transaction data signatures, a token may use a dynamic variable that comprises the combination of transaction data and a time value provided by a clock of for example the computing platform that the authentication application is running on. In case the authentication application only uses internally generated values for the dynamic variable the dynamic variable may be referred to as an internal dynamic variable and the generated dynamic credential may be referred to as a 'one-time password'. In case the token uses a dynamic variable that comprises an externally generated challenge, the generated dynamic variable may be referred to as a 'response'. In case the token uses a dynamic variable that comprises transaction data, the generated dynamic credential may be referred to as a 'transaction data signature' or just shortly as a 'signature'.

Recovering a dynamic credential originally generated by a server

In some embodiments the actual dynamic credential that the authentication application will display to the user or will send to a verification or application server, is not originally generated by the authentication application. Instead the dynamic credential may originally be created by some server (such as the verification server) and may be sent to the authentication device. For example, the dynamic credential may be created as an electronic signature that may be a cryptographic function of the transaction data that the dynamic credential is associated with, or it may be generated as a function of a random or pseudo-random number and may be associated and stored in for example a database with the transaction that the dynamic credential will be used for. For example, in some embodiments a server may generate a dynamic credential that corresponds to the transaction data that may have to be reviewed and approved and may send a message to the authentication device that comprises both the transaction data and the corresponding dynamic credential. The authentication application on the authentication device may receive the message and retrieve the transaction data and the corresponding dynamic credential from this message. Therefore in some embodiments the action by the authentication application on an authentication device of generating a dynamic credential may comprise or consist of receiving a message containing the dynamic credential that has been originally created by a server and subsequently extracting the dynamic credential from the message comprising transaction data and the corresponding dynamic credential.

For example, in some embodiments a server may generate a dynamic credential that corresponds to the transaction data that may have to be reviewed and approved and may send a message to the authentication device that comprises both the transaction data and the corresponding dynamic credential. The authentication application on the authentication device may receive the message and retrieve the transaction data and the corresponding dynamic credential from this message. Therefore, in some embodiments the action by the authentication application on an authentication device of generating a dynamic credential may comprise or consist of receiving a message that contains a dynamic credential which has been originally created by a server and subsequently extracting this dynamic credential from the received message.

Dynamic credential encrypted for confidentiality.

In order to protect the dynamic credential in such a message against a man-in-the-middle who might intercept the message and try to extract the dynamic credential from the message, cryptographic techniques may be used to protect the confidentiality of the dynamic credential comprised in the message. For example, in some embodiments the dynamic credential in the message may have been encrypted and the authentication application may be adapted to decrypt the dynamic credential as part of the act of retrieving the dynamic credential from the received message. In some embodiments the message comprising the dynamic credential may have been encrypted and the authentication application may be adapted to decrypt the message as part of the act of retrieving the dynamic credential from the received message.

Dynamic credential cryptographically linked to transaction data, e.g. through a signature.

In order to protect the dynamic credential in such a message against a man-in-the-middle who might intercept the message and try to replace the transaction data in the message that correspond to the dynamic credential in the message with other transaction data that don't correspond to the dynamic credential, cryptographic techniques may be used to protect the integrity of the link or correspondence between the dynamic credential and the transaction data comprised in the message. In some embodiments the message may comprise a signature over a combination of the transaction data and the corresponding dynamic credential and the authentication application may be adapted to extract this signature from the message and verify this extracted signature as part of the act of retrieving the dynamic credential and the transaction data from the received message.

In some embodiments the authentication application may be adapted to present the generated dynamic credential to the user (290). In some embodiments the user may forward the presented dynamic credential to a server (220) for verification. In some embodiments the authentication device may present the dynamic credential to the user in a visual way (e.g. by using a display). In some embodiments the presented dynamic credential may be encoded in the format of a string of characters. In some embodiments the string may only comprise decimal characters. In some embodiments the string may comprise alphanumerical characters. In some embodiments the string may comprise characters from a non-alphabetical writing system (such as for example Chinese or Japanese characters).

In some embodiments the authentication device or authentication application may be adapted to generate a signature over transaction data. In some embodiments the authentication device or the authentication application may display to the user the transaction data over which the signature is or will be generated so that the user can verify the correctness of the transaction data for which the authentication device or authentication application has generated or will generate a signature. In some embodiments the authentication device or the authentication application may display to the user the transaction data and the user must confirm or approve the displayed transaction data (e.g. by touching or clicking an OK button of the authentication application) as a condition for the authentication device or the authentication application to generate and/or display the signature for the displayed and approved transaction data.

In some embodiments the authentication device executing the authentication application may be adapted to send the generated dynamic credential automatically to a remote server which may for example comprise an application server (210) hosting the remote application or a credential generation server (220) for verifying dynamic credentials. In some embodiments the authentication device executing the authentication application may have a direct or indirect data connection with the remote server. For example, in some embodiments the authentication device executing the authentication application may have an internet connection and may use that internet connection to send the generated dynamic credential to the remote server. In some embodiments the authentication device executing the authentication application may comprise for example a smartphone or tablet computer executing an authentication app and the smartphone or tablet computer may have a wireless internet connection.

In some embodiments the authentication device executing the authentication application may be adapted to display the generated dynamic credential to the user and the user may copy the displayed dynamic credential to an access device that the user may be using to interact with the remote application and the access device may forward the dynamic credential that the user provided to the remote server.

In some embodiments the remote server may for example be an application server (210) hosting the remote application. Alternatively, the remote server may be a different server such as a credential verification server (220). In the latter case the remote server may, after verification of the received dynamic credential, inform the remote application of the outcome of the verification of the received dynamic credential.

Methods for authenticating a user or transactions submitted by a user.

In one aspect of the invention a method for authenticating a user or transactions submitted by a user to a remote application of for securing interaction between a user and a remote application is provided.

In some embodiments a method according to the invention may comprise at least some of the steps performed by an authentication application running on an authentication device as described elsewhere in this description.

In some embodiments the method may comprise a method to secure a user's interaction with a remotely accessible computer-based application, the method comprising performing at a personal computing device the steps of: obtaining transaction data; displaying the obtained transaction data on a display of the personal computing device for review by the user; obtaining a dynamic credential associated with the transaction data; and making the dynamic credential available for verification.

In some embodiments the step of obtaining the transaction data may comprise receiving at the personal computing device a message containing the transaction data.

In some embodiments the step of obtaining a dynamic credential may comprise applying a cryptographic algorithm that is parameterized by a cryptographic key which may be or which may be derived from a secret associated with the user. In some embodiments this secret may be stored in the personal computing device. In some embodiments the dynamic credential may be obtained by applying the cryptographic algorithm to the transaction data. In some embodiments the value of the dynamic credential may be a result of the cryptographic algorithm. In some embodiments the cryptographic algorithm may also use other data such as for example a time value or the value of an event-related variable.

In some embodiments the dynamic credential may be obtained by applying the cryptographic algorithm to at least a part of a message that is received at the personal computing device and that contains the transaction data. In some embodiments applying the cryptographic algorithm to at least a part of this message may comprise decrypting a part of the message.

In some embodiments the method may comprise any method of the previous embodiments and may further comprise providing at the personal computing device, while performing the step of displaying the obtained transaction data, an approval indication mechanism for the user to indicate the user's approval or rejection and obtaining by using this mechanism from the user an indication of the user's approval or rejection. In some embodiments the step of obtaining from the user an indication of the user's approval or rejection may comprise receiving an input signal from the user through a user input interface of the personal computing device. In some embodiments the user input interface of the personal computing device may comprise a touch screen and receiving an input signal from the user may comprise detecting a touch or click on a particular area of the touch screen. In some embodiments providing the approval indication mechanism may comprise displaying on the display of the personal computing device at least one button for the user to click or touch. In some embodiments providing the approval indication mechanism may comprise displaying on the display of the personal computing device an Ok and a Cancel button for the user to click or touch whereby obtaining the user's approval comprises receiving a click or touch of the Ok button and obtaining the user's rejection comprises receiving a click or touch of the Cancel button. In some embodiments the obtained user's approval or rejection may be interpreted as an approval or rejection of the displayed transaction data. In some embodiments at least the step of obtaining the dynamic credential or the step of making the dynamic credential available for verification may be conditional on obtaining through this mechanism the user's approval at the personal computing device an indication of the user's approval.

In some embodiments the step of making the dynamic credential available for verification may comprise displaying at the personal computing device the dynamic credential on a display of the personal computing device. In some embodiments the step of making the dynamic credential available for verification may further comprise the user providing the dynamic credential displayed on the display of the personal computing device to the remotely accessible computer-based application. In some embodiments the step of making the dynamic credential available for verification may further comprise receiving at an access computing device (such as a Personal Computer or a tablet computer) the dynamic credential displayed on the display of the personal computing device which is manually copied by the user the access computing device, and the access computing device sending the received dynamic credential over a computer network to a server such as a credential verification server or a remote application server hosting the remotely accessible computer based application.

In some embodiments the step of making the dynamic credential available for verification may comprise at the personal computing device sending the dynamic credential over a data communication network, by using a data communication interface comprised in the personal computing device, to a server such as a credential verification server or a remote application server hosting the remotely accessible computer based application.

In some embodiments the above mentioned computer network and/or data communication network may comprise the internet and/or a wireless data communication network such as a mobile phone data network.

In some embodiments the method may comprise any method of the previous embodiments and may further comprise the steps of receiving and verifying at a credential verification server the dynamic credential. In some embodiments the step of verifying the dynamic credential may comprise any of the verification methods described elsewhere in this description.

In some embodiments the step of displaying the obtained transaction data on a display of the personal computing device for review by the user may comprise an authentication application that is running on the personal computing device displaying the obtained transaction data in a transaction data presentation area of the display of the personal computing device. In some embodiments the transaction data presentation area may comprise the entirety or a part of a transaction data displaying window of the authentication application on the display of the personal computing device.

In some embodiments the method may comprise any method of the previous embodiments and may further comprise the step of ensuring at the personal computing device that no window of another application that is running on the personal computing device can partially or entirely hide or obscure the authentication application's transaction data presentation area. In some embodiments the method may further comprise the step of ensuring at the personal computing device that no other window of another application that is running on the personal computing device can partially or entirely hide or obscure the authentication application's transaction data displaying window. In some embodiments the step of ensuring at the personal computing device that no other window of another application that is running on the personal computing device can partially or entirely hide or obscure the transaction data displaying window may comprise the authentication application calling one or more operating system functions to ensure that the transaction data displaying window remains on top or to force the transaction data displaying window to remain on top. In some embodiments the step of the authentication application calling one or more operating system functions to ensure or enforce that the transaction data displaying window remains on top, may comprise the authentication application calling one or more operating system functions to ensure or enforce that the transaction data displaying window remains on top while the transaction data displaying window is displaying the transaction data or until the authentication application has received an indication of the user's approval or rejection of the displayed transaction data.

In some embodiments the method may comprise any method of the previous embodiments and may further comprise the step of ensuring that if the authentication application's transaction data presentation area or the authentication application's transaction data displaying window is being hidden or obscured partially or entirely by a window that is not a window of the authentication application then at least the step of making the dynamic credential available for verification is not performed. In some embodiments at least the step of making the dynamic credential available for verification is not performed at least as long as the authentication application's transaction data presentation area or the authentication application's transaction data displaying window is being hidden or obscured partially or entirely by a window that is not a window of the authentication application.

In some embodiments the method may comprise any method of the previous embodiments and may further comprise the step of ensuring that the approval indication mechanism is disabled if it is detected, by the authentication application or by the operating system of the personal computing device, that the authentication application's transaction data presentation area or the authentication application's transaction data displaying window is being hidden or obscured partially or entirely by another window. In some embodiments the step of ensuring that the approval indication mechanism is disabled if it is detected that the authentication application's transaction data presentation area or the authentication application's transaction data displaying window is being hidden or obscured partially or entirely by another window may comprise the authentication application calling one or more operating system functions that cause the operating system to block or not pass to the approval indication mechanism a user input event that indicates a user's approval.

In some embodiments the method may comprise any method of the previous embodiments and may further comprise an overlay detection step of detecting or verifying whether the authentication application's transaction data presentation area or the authentication application's transaction data displaying window is being hidden or obscured partially or entirely by another window. In some embodiments detecting or verifying whether the authentication application's transaction data presentation area or the authentication application's transaction data displaying window is being hidden or obscured partially or entirely by another window may comprise the authentication application calling one or more operating system functions to detect whether the authentication application's transaction data presentation area or the authentication application's transaction data displaying window is being hidden or obscured partially or entirely by another window.

In some embodiments the method may comprise any method of the previous embodiments and may further comprise the step of the authentication application disabling the approval indication mechanism if it is detected that the authentication application's transaction data presentation area or the authentication application's transaction data displaying window is being hidden or obscured partially or entirely by another window.

In some embodiments the method may comprise any method of the previous embodiments and may further comprise the step of ignoring an indication of the user's approval that has been obtained by the approval indication mechanism if it is detected that the authentication application's transaction data presentation area or the authentication application's transaction data displaying window is being hidden or obscured partially or entirely by another window. In some embodiments the step of making the dynamic credential available for verification may be conditional on the overlay detection step (i.e. the step of detecting or verifying whether the authentication application's transaction data presentation area or the authentication application's transaction data displaying window is being hidden or obscured partially or entirely by another window) not indicating that the authentication application's transaction data presentation area or the authentication application's transaction data displaying window is being hidden or obscured partially or entirely by another window.

In some embodiments the method may comprise any method of the previous embodiments and may further comprise the step of providing the user a visual indication for alerting the user to the presence of an anomaly if the overlay detection step indicates that the authentication application's transaction data presentation area or the authentication application's transaction data displaying window is being hidden or obscured partially or entirely by another window.

In some embodiments the method may comprise any method of the previous embodiments and may further comprise the steps of the authentication application entering a safe mode if the overlay detection step indicates that the authentication application's transaction data presentation area or the authentication application's transaction data displaying window is being hidden or obscured partially or entirely by another window, and the authentication application remaining in the safe mode at least until after the authentication application's transaction data presentation area or the authentication application's transaction data displaying window is no longer being hidden or obscured partially or entirely by another window for at least a certain minimum period of time. In some embodiments this minimum period of time may be a configurable parameter of the authentication application. In some embodiments this minimum time period is zero seconds. In some embodiments this minimum time period is at least 2 seconds. In some embodiments this time period is no more than 30 seconds. In some embodiments this minimum time period is at least 30 seconds and no more than 2 minutes.

In some embodiments, as long as the authentication application is in safe mode, the approval indication mechanism may be disabled, or an indication of the user's approval that has been obtained by the approval indication mechanism may be ignored, or the step of generating the dynamic credential may not be performed (or may be put on hold), or the step of making the dynamic credential available for verification may not be performed (or may be put on hold). In some embodiments, as long as the authentication application is in safe mode, the authentication application may provide a visual indication to alert the user that the authentication application is in safe mode.

In some embodiments wherein an approval indication mechanism is provided, the approval indication mechanism may comprise a visual approval activation element on the display of the personal computing device that the user must activate to indicate the user's approval whereby the visual approval activation element may have an activation area that is responsive to an action of the user and whereby an area of the display that is covered by the activation area of the visual approval activation element may overlap at least partially with any rectangle on the display that covers all the displayed transaction data. In some embodiments at least any part of the activation area of the visual approval activation element that is covered by a window that is not a window of the authentication application, is not responsive to an action of the user to activate the visual approval activation element. In some embodiments the user activating the visual approval activation element may comprise the user clicking or touching or sliding the activation area of the visual approval activation element. In some embodiments the visual approval activation element may comprise a clickable or touchable button. In some embodiments at least a part of the displayed transaction data may be displayed over the activation area of the visual approval activation element. In some embodiments at least parts of the displayed transaction data are displayed at at least two positions of: left of, right of, above of or below of the activation area of the visual approval activation element.

In some embodiments the step of making the dynamic credential available for verification may comprise displaying the dynamic credential on the display of the personal computing device whereby the activation area of the visual approval activation element is covered by the displayed transaction data and whereby the area for displaying the dynamic credential is covered by the area for displaying the transaction data, and whereby the dynamic credential is not visible until the user has activated the visual approval activation element. In some embodiments activating the visual approval activation element may comprise the user touching and sliding at least a part of the visual approval activation element thus sliding away at least a part of the displayed transaction data and revealing a representation of the dynamic credential. In some embodiments activating the visual approval activation element may comprise the user touching and sliding in different directions at least two parts of the visual approval activation element thus sliding away at least a part of the displayed transaction data and revealing a representation of the dynamic credential. In some embodiments the user releasing the visual approval activation element results in the displayed transaction data snapping back to the original position and the displayed dynamic credential being no longer visible.

In some embodiments the method may comprise any method of the previous embodiments wherein the step of making the dynamic credential available for verification may comprise displaying the dynamic credential on the display of the personal computing device together with displaying the transaction data, whereby the dynamic credential is displayed at the same time and in the same area of the display as the transaction data, such that any rectangle which encloses all the displayed transaction data automatically also encloses at least a part of the dynamic credential. For example, in some embodiments the transaction data and the dynamic credential may be displayed in an overlapping way or stacked on top of each other, or the dynamic credential may be displayed surrounded by the displayed transaction data. In some embodiments the representation of the dynamic credential that is displayed on the display of the personal computing device and the representation of the transaction data that is displayed on the display of the personal computing device, may have different visual characteristics to enable the user to distinguish the dynamic credential from the transaction data. For example, in some embodiments some or all of the characters used for displaying the dynamic credential have different visual characteristics than some or all of the characters used for displaying the transaction data. In some embodiments some or all of the characters used for displaying the dynamic credential have a different font type, or font size or font color than some or all of the characters used for displaying the transaction data.

In some embodiments the method may be for securing an interaction session of a user with a remotely accessible computer-based application, and may comprise performing at a personal computing device the steps of: obtaining transaction data related to said interaction session; displaying, by an authentication application running on the personal computing device, the obtained transaction data on a first area of a display of the personal computing device for review by the user; obtaining a dynamic credential associated with the transaction data; making, by the authentication application, the dynamic credential available for verification using a second area of the display of the personal computing device; and creating a visually perceptible continuity between the first area and the second area by giving a first visually perceptible element of the first area and a second visually perceptible element of the second area the same common specific value, such that the presence of an overlay window that is not a window of the authentication application and that partially or entirely hides or obscures the first area and that doesn't have a third visually perceptible element with the same value as said common specific value for said first and second visually perceptible elements causes a visually perceptible discontinuity between the overlay window and the second area alerting the user to the presence of said overlay window.

In some embodiments step of making, by the authentication application, the dynamic credential available for verification using a second area of the display of the personal computing device, may comprise displaying the dynamic credential on said second area.

In some embodiments the step of making the dynamic credential available for verification using a second area of the display of the personal computing device may comprise providing at the personal computing device an approval indication mechanism for the user to indicate an approval or rejection by the user and obtaining by using this mechanism from the user an indication of the user's approval or rejection, whereby the approval indication mechanism may comprise a visual approval activation element on the display of the personal computing device that the user must activate to indicate the user's approval whereby the visual approval activation element has an activation area that is responsive to an action of the user and whereby the activation area of the visual approval activation element is a part of the second area.

In some embodiments the step of making the dynamic credential available for verification using a second area of the display of the personal computing device may further comprise displaying the dynamic credential on the display of the personal computing device if said user's approval has been obtained.

In some embodiments the step of making the dynamic credential available for verification using a second area of the display of the personal computing device may further comprise sending over a data communication network the dynamic credential to a server computer if said user's approval has been obtained.

In some embodiments the common specific value for the first and second visually perceptible elements may have an unpredictable element or an unpredictable aspect. In some embodiments the common specific value for the visually perceptible elements may vary in time. In some embodiments the common specific value for the visually perceptible elements may vary from one interaction session to another. In some embodiments the common specific value for the visually perceptible elements may vary from one personal computing device to another. In some embodiments the common specific value for the visually perceptible elements may vary from one user to another. In some embodiments the common specific value for the first and second visually perceptible elements may be different of the default or standard values for visually perceptible elements of the same type.

In some embodiments the common specific value may have an element or aspect that is unpredictable in the sense that it is hard or impossible for an entity mounting an overlay attack to know or guess in advance the correct value of the common specific value that a specific authentication application instance on a specific personal computing device will use for a specific authentication session or user interaction session or transaction or usage of the authentication application. In some embodiments the common specific value may have an element or aspect that is unpredictable in the sense that knowledge of the common specific value that was used for a specific authentication application instance or for a specific personal computing device or for a specific past authentication session or user interaction session or transaction or usage of the authentication application, is not sufficient for an entity mounting an overlay attack to know or guess in advance the correct value of the common specific value that a possible different specific authentication application instance on a possibly different specific personal computing device will use for a subsequent specific authentication session or user interaction session or transaction or usage of the authentication application. In some embodiments the common specific value may have an element or aspect that is unpredictable in the sense that it may be determined in a random or pseudo-random way. In some embodiments the common specific value may be determined using an algorithm that uses a secret which may for example be different form one authentication application instance to another or from one personal computing device to another.

In some embodiments the first area may be adjacent to the second area.

In some embodiments the first and second visually perceptible elements may comprise some or all of the characters of texts displayed in these first and second areas and the common specific value may comprise a visual characteristic of these characters. The common specific value may for example comprise the font size, the font type or the font color of these characters.

In some embodiments the first visually perceptible element may comprise a first background of the first area and the second visually perceptible element may comprise a second background of the second area and the common specific value may comprise a visual characteristic of the first and second backgrounds. For example, the common specific value may comprise a color or a pattern (such as a tiling pattern) of the first and second backgrounds.

In some embodiments the first and second background may be non-uniform and the first visually perceptible element may comprise a first distortion of the first background and the second visually perceptible element may comprise a second distortion of the second background and the common specific value may comprise a common characteristic of the first and second distortions.

In some embodiments the first background may comprise a first picture and the second background may comprise a second picture whereby the common specific value may comprise the fact that the first and second pictures are both part of a single source picture. For example, the first and second picture may be two halves of the same source picture, whereby this fact may be recognizable to the user. The source picture may be a picture randomly selected from a large collection of pictures. The source picture may for example be a picture of a landscape.

In some embodiments the common specific value may change in time. In some embodiments the common specific value may change in time in an unpredictable way.

In some embodiments the first and second visually perceptible elements of the first and second areas may vary in time and the common specific value may comprise a common value for an aspect of a variation in time of the first and second visually perceptible elements. For example, the first visually perceptible element may comprise a first movement of a first background of the first area and the second visually perceptible element may comprise a second movement of a second background of the second area and the common specific value may comprise a common characteristic of the first and second movements. For example, in some embodiments the common specific value may comprise a common speed of these first and second movements, or the common specific value may comprise a common direction of the first and second movements.

In some embodiments the method may comprise any method of the previous embodiments wherein the step of obtaining a dynamic credential may comprise using a cryptographic algorithm that may be parameterized with a cryptographic key that may comprise or may be derived from a secret stored in the personal computing device. For example, in some embodiments the step of obtaining a dynamic credential may comprise generating the dynamic credential by cryptographically combining the transaction data with a cryptographic key that comprises or is derived from a secret stored in the personal computing device. For example, in some embodiments the step of obtaining a dynamic credential may comprise decrypting at least a part of a message containing the transaction data and retrieving, the dynamic credential from the decrypted part of the message, whereby the decrypting may be done by performing a cryptographic decryption algorithm that may be parameterized with a cryptographic decryption key that may comprise or may be derived from a secret stored in the personal computing device.

In some embodiments, the step of making the dynamic credential available for verification may comprise sending the dynamic credential to a credential verification server. For example, in some embodiments the step of making the dynamic credential available for verification may comprise an authentication application causing the personal computing device to send a message comprising the dynamic credential to a server computer such as a credential verification server or a remote application server which may forward the dynamic credential to the credential verification server. For example, in some embodiments the step of making the dynamic credential available for verification may comprise an authentication application causing the personal computing device to display the dynamic credential on the display of the personal computing device for the user to read so that the user can forward the displayed dynamic credential to a credential verification server, for example, by manually copying the displayed dynamic credential to an access device that the user is interacting with, whereby by the access device may subsequently send, for example over a computer network such as the Internet, the dynamic credential that the user copied to the credential verification server or a remote application server which may in turn forward the dynamic credential to the credential verification server. In some embodiments all or at least some of the steps may be carried out by an authentication application software that runs on the personal computing device causing the personal computing device to perform these steps.

Apparatus for authenticating a user or transactions submitted by a user.

In one aspect of the invention an authentication apparatus for authenticating a user or transactions submitted by a user to a remote application of for securing interaction between a user and a remote application, as described elsewhere in this application, is provided. In some embodiments the authentication apparatus may comprise any of the authentication apparatus or personal computing devices described elsewhere in this description.

In some embodiments the authentication apparatus may comprise a personal computing device to secure a user's interaction with a remotely accessible computer-based application, which personal computing device may comprise a display for displaying information to the user, a user input interface for receiving inputs from the user, a memory component storing an operating system software and an authentication application software, and a data processing component for running the operating system software and the authentication application; wherein the authentication application may be configured to cause the personal computing device to: obtain transaction data; display the obtained transaction data on the display for review by the user in a transaction data presentation area of the display; obtain a dynamic credential associated with the transaction data; make the dynamic credential available for verification; and ensure that no window of another application that is running on the personal computing device can partially or entirely hide or obscure the authentication application's transaction data presentation area.

In some embodiments the authentication apparatus may comprise a personal computing device to secure a user's interaction with a remotely accessible computer-based application, which personal computing device may comprise a display for displaying information to the user, a user input interface for receiving inputs from the user, a memory component storing an operating system software and an authentication application software, and a data processing component for running the operating system software and the authentication application; wherein the authentication application may be configured to cause the personal computing device to: obtain transaction data; display the obtained transaction data in a transaction data displaying window of the authentication application on the display for review by the user; obtain a dynamic credential associated with the transaction data; make the dynamic credential available for verification; and ensure that at least the step of making the dynamic credential available for verification is not performed or cannot be successfully performed if the authentication application's transaction data presentation area or the authentication application's transaction data displaying window is being hidden or obscured partially or entirely by another window that is not displayed by the authentication application.

In some embodiments the authentication apparatus may comprise a personal computing device to secure an interaction session of a user of the personal computing device with a remotely accessible computer-based application, which personal computing device may comprise a display for displaying information to the user, a user input interface for receiving inputs from the user, a memory component storing an operating system software and an authentication application software, and a data processing component for running the operating system software and the authentication application; wherein the authentication application may be configured to cause the personal computing device to: obtain transaction data related to said interaction session; display the obtained transaction data on a first area of a display of the personal computing device for review by the user; obtain a dynamic credential associated with the transaction data; make the dynamic credential available for verification using a second area of the display of the personal computing device; and create a visually perceptible continuity between the first area and the second area by giving a first visually perceptible element of the first area and a second visually perceptible element of the second area the same common specific value, such that the presence of an overlay window that is not displayed by the authentication application and that partially or entirely hides or obscures the first area and that doesn't have a third visually perceptible element with the same value as said common specific value for said first and second visually perceptible elements causes a visually perceptible discontinuity between the overlay window and the second area alerting the user to the presence of said overlay window.

In some embodiments the apparatus may comprise a personal computing device that is adapted to perform one or more or all steps of any of the methods described above. In some embodiments the personal computing device may comprise a display, a user input interface, a data processing component and a memory component. In some embodiments the personal computing device may also comprise a data communication interface. In some embodiments the memory component may store a software comprising an authentication application to be executed by the data processing component. In some embodiments the authentication application may comprise any of the authentication applications described elsewhere in this description. In some embodiments the authentication application may cause, when being executed by the data processing component, the personal computing device to perform one or more or all steps of any of the methods described above. In some embodiments the memory may also store the software code of an operating system and the data processing component may be adapted and/or configured to execute that operating system and the personal computing device may be running that operating system while it is running the authentication application. In some embodiments the authentication application may be adapted to call one or more functions of the operating system as described in more detail elsewhere in this description.

Systems for authenticating a user or for authenticating transactions submitted by a user.

In one aspect of the invention a system for authenticating a user or transactions submitted by a user to a remote application of for securing interaction between a user and a remote application, as described elsewhere in this application, is provided. In some embodiments the system may comprise any of the authentication apparatus or authentication devices described above or elsewhere in this description. In some embodiments the system may comprise a remote application server adapted to host a remotely accessible computer based application. In some embodiments the system may comprise any of the credential verification servers as described elsewhere in this description. In some embodiments the remote application server and/or the credential verification server may comprise one or more server computers. In some embodiments the remote application server and the credential verification server may be combined in the same server.

In some embodiments the system may comprise a system to secure a user's interaction with a remotely accessible computer-based application, which may comprise: a remote application server for hosting the remotely accessible computer-based application, an access device for allowing said user's interaction with a remotely accessible computer-based application, a credential verification server for verifying the validity of a dynamic credential associated with transaction data of the remotely accessible computer-based application, and a personal computing device comprising a display for displaying information to the user, a user input interface for receiving inputs from the user, a memory component storing an operating system software and an authentication application software, and a data processing component for running the operating system software and the authentication application; wherein the authentication application may be configured to cause the personal computing device to: obtain the transaction data; display the obtained transaction data on the display for review by the user in a transaction data presentation area of the display; obtain the dynamic credential associated with the transaction data; make the dynamic credential available for verification; and ensure that no window of another application that is running on the personal computing device can partially or entirely hide or obscure the authentication application's transaction data presentation area.

In some embodiments the system may comprise a system to secure a user's interaction with a remotely accessible computer-based application, which may comprise: a remote application server for hosting the remotely accessible computer-based application, an access device for allowing said user's interaction with a remotely accessible computer-based application, a credential verification server for verifying the validity of a dynamic credential associated with transaction data of the remotely accessible computer-based application, and a personal computing device comprising a display for displaying information to the user, a user input interface for receiving inputs from the user, a memory component storing an operating system software and an authentication application software, and a data processing component for running the operating system software and the authentication application; wherein the authentication application may be configured to cause the personal computing device to: obtain the transaction data; display the obtained transaction data in a transaction data displaying window of the authentication application on the display of the personal computing device for review by the user; obtain the dynamic credential associated with the transaction data; make the dynamic credential available for verification; and ensure that at least the step of making the dynamic credential available for verification is not performed or cannot be successfully performed if the authentication application's transaction data presentation area or the authentication application's transaction data displaying window is being hidden or obscured partially or entirely by a window that is not a window of the authentication application.

In some embodiments the system may comprise a system to secure a user's interaction session with a remotely accessible computer-based application, which may comprise: a remote application server for hosting the remotely accessible computer-based application, an access device for allowing said user's interaction session with a remotely accessible computer-based application, a credential verification server for verifying the validity of a dynamic credential associated with transaction data of the remotely accessible computer-based application, and a personal computing device comprising a display for displaying information to the user, a user input interface for receiving inputs from the user, a memory component storing an operating system software and an authentication application software, and a data processing component for running the operating system software and the authentication application; wherein the authentication application may be configured to cause the personal computing device to: obtain transaction data related to said interaction session; display the obtained transaction data on a first area of a display of the personal computing device for review by the user; obtain a dynamic credential associated with the transaction data; make the dynamic credential available for verification using a second area of the display of the personal computing device; and create a visually perceptible continuity between the first area and the second area by giving a first visually perceptible element of the first area and a second visually perceptible element of the second area the same common specific value, such that the presence of an overlay window that is not a window of the authentication application and that partially or entirely hides or obscures the first area and that doesn't have a third visually perceptible element with the same value as said common specific value for said first and second visually perceptible elements causes a visually perceptible discontinuity between the overlay window and the second area alerting the user to the presence of said overlay window.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention. Various specific details are provided in order to enable a thorough understanding of the invention. However, it will be understood by a person skilled in the relevant art that the present invention may be practiced without these specific details. In other instances, well-known methods, procedures, components and circuits have not been described in detail so as not to obscure the present invention. Various modifications to the described embodiments will be apparent to persons skilled in the art, and the general principles of the embodiments described in detail below may be applied to other embodiments.

Figure 1:
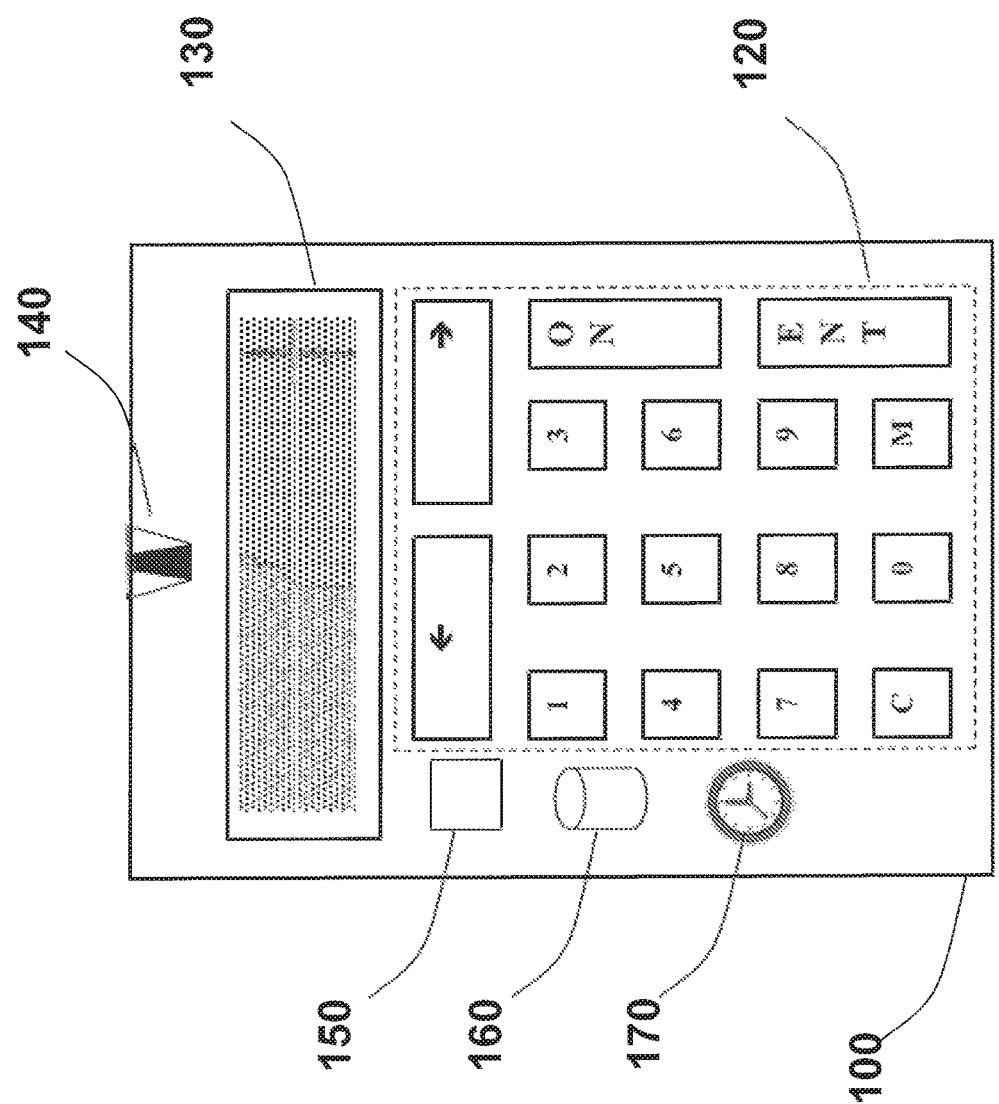
FIG. 1 schematically illustrates an exemplary apparatus according to an aspect of the invention.

FIG. 1 schematically illustrates an exemplary electronic apparatus (100) according to an aspect of the invention. The apparatus of FIG. 1 comprises an authentication device. In some embodiments the authentication device is adapted to generate dynamic credentials on behalf of a user. In some embodiments the dynamic credentials generated by the authentication device may comprise for example one-time passwords and/or electronic signatures over for example transaction data and/or responses to challenges. In some embodiments the authentication device may comprise a smartphone or a tablet computer.

Processor (150) and memory (160).

The authentication device may comprise a digital data processing component (150) that may be adapted to execute a set of data processing instructions. In some embodiments the data processing component (150) may comprise for example one or more microprocessors, microcontrollers, Digital Signal Processor (DSP) chips, Field Programmable Gate Arrays (FPGA), etcetera. In some embodiments the digital data processing component may execute the instructions comprised in one or more pieces of software. These one or more pieces of software may for example comprise an operating system (such as for example Android or iOS) and/or an authentication application which may be adapted to generate dynamic credentials as explained in more details elsewhere in this description. In some embodiments the dynamic credentials generated by the authentication application may comprise for example one-time passwords and/or electronic signatures over for example transaction data and/or responses to challenges.

Multiple instances

In some embodiments the authentication device is adapted to support multiple instances of an authentication application which may each be associated with a different user. In some embodiments each instance may comprise data that the authentication application may use to determine for example cryptographic keys such as one or more cryptographic credential generation keys that the authentication application may use to generate a dynamic credential on behalf of the user associated with that instance.

The authentication device may comprise a memory component (160) which may be coupled to the digital data processing component. In some embodiments the memory component may comprise a program memory component that is adapted to store software or firmware to be executed by the data processing component. For example, in some embodiments the software or firmware stored in the memory of the authentication device may comprise an operating system and/or an authentication application.

In some embodiments the memory component (160) may comprise a data memory component that is adapted to permanently or temporarily store data. In some embodiments the data memory component may be adapted to securely store secret data such as cryptographic keys or PIN or password reference data. In some embodiments the data memory component may be adapted to store the data of multiple instances of an authentication application.

The memory component may for example comprise RAM (Random Access Memory) memory, ROM (Read-Only Memory) memory, EPROM (Erasable Programmable Read-Only Memory) memory, one-time programmable memory, flash memory, solid-state memory, a hard-disk, etc.

User interface (120, 130)

In some embodiments the authentication device may comprise a user interface (120, 130) to interact with a user, e.g. to exchange data, information and/or commands with a user.

In some embodiments the authentication device's user interface may comprise an output user interface (130) for presenting information and/or data to a user of the strong authentication token. In some embodiments the output user interface may comprise for example a display (130) or an audio output interface. In some embodiments the authentication device's user interface may comprise an input user interface (120) for receiving inputs from a user such as for example input data (like a challenge or transaction data) or instructions (like a confirmation or cancellation) or a PIN. In some embodiments the input user interface may comprise for example a keyboard (120). In some embodiments the authentication device's user interface may comprise a touch screen which may be adapted to offer both the functions of a user output interface and a user input interface.

Data input interface (140)

In some embodiments the authentication device may comprise a digital data input interface. In some embodiments the authentication device's digital data input interface may be adapted to receive digital data messages. In some embodiments the data input interface may comprise an optical image acquiring component (140). In some embodiments the optical image acquiring component may comprise a camera. In some embodiments the authentication device may be adapted to capture with the optical image acquiring component images that may be encoded with a digital data message. In some embodiments the image may comprise a two-dimensional barcode. In some embodiments the format of the image may be defined in a standard. For example, in some embodiments the optical image may be a QR-code.

In other embodiments the digital data input interface may comprise an acoustical interface adapted to capture acoustical signals that may be encoded with a messages or commands for the token. In some embodiments the acoustical interface may comprise a microphone. In some embodiments the acoustical interface may comprise an analogue-to-digital convertor to convert the analogue electronic signal into a digital signal that may be further processed by for example the digital data processing component discussed above.

In some embodiments the digital data input interface may comprise a wireless data communication interface. In some embodiments the wireless data communication interface may comprise an antenna. In some embodiments the wireless data communication interface may be adapted to receive a modulated radio signal encoded with a digital data message.

In some embodiments an authentication application running on the authentication device may be adapted to use the data input interface to receive a digital data message. In some embodiments the digital data message may comprise transaction data and the authentication application may be adapted to retrieve the transaction data comprised in the digital data message and use the retrieved transaction data for further processing, e.g. to display to the user and/or to generate a corresponding dynamic credential as is described in more detail elsewhere in this description.

Credential generation

The authentication device may be adapted to generate dynamic credentials as explained in more detail elsewhere in this description. In some embodiments the data processing component (150) may be adapted to perform cryptographic calculations to generate the dynamic credentials. In some embodiments the authentication device may be adapted to generate dynamic credentials using cryptographic keys that may be stored permanently or temporarily in the memory component (160) or that the authentication device may derive from data stored permanently or temporarily in the memory component (160). In some embodiments the authentication device may be adapted to generate dynamic credentials using data that is part of an instance of an authentication application stored in the memory component (160).

In some embodiments the authentication device or authentication application may be adapted to generate dynamic credentials using a dynamic variable that may comprise an internal value provided by the token. For example, in some embodiments the authentication device may comprise a clock (170) and the authentication device or authentication application may use as an internal value the time value provided by that clock. In some embodiments the authentication device may maintain an event-related variable such as a counter as part of the data of an instance of the authentication application and the authentication device or authentication application may be adapted to use the value of that event-related variable as an internal value to generate a dynamic credential for that instance and update the value of that event-related variable as a function of the current value (e.g. by incrementing or decrementing a counter value) each time the authentication device or authentication application uses the value of that counter to generate a dynamic credential. For example, in some embodiments the updated value of the event-related variable may be calculated by applying a hash function to the current value of the event-related variable.

In some embodiments the authentication device or authentication application may be adapted to generate dynamic credentials using a dynamic variable that may comprise an external value provided to the token. In some embodiments such an external value may comprise a challenge generated by a server or transaction data to be signed. In some embodiments the external value may be manually provided to the authentication device or authentication application by the user by using the user input interface of the token. For example, the token may capture a challenge or transaction data the user may enter as a string of characters on a keyboard comprised in the token. In some embodiments the external value is provided comprised in a message or command that is received by the authentication device or authentication application by means of the authentication device's data input interface.

In some embodiments the authentication device or authentication application may be adapted to present the generated dynamic credential to the user. For example, in some embodiments the authentication device or authentication application may display the generated dynamic credential as a string of readable characters on the display of the authentication device. In some embodiments the string may comprise only decimal characters. In other embodiments the string may comprise alphanumerical characters.

Secure dedicated hardware token

In some embodiments the authentication device (100) is a dedicated hardware device and may be called a token or strong authentication token. In some embodiments the token may be dedicated to be used in methods to secure a user's access to an application or to secure a user's interaction with such an application. In some embodiments the main goal of the authentication device is to be used in methods to secure a user's access to an application or to secure a user's interaction with such an application. In some embodiments, in order to guarantee the authentication device's dedication to its use as a security device, the authentication device may be adapted to make it impossible to alter its firmware. In some embodiments, in order to guarantee the authentication device's dedication to its use as a security device, any change to or update of its firmware is only possible through a secure firmware update protocol that is designed to ensure that only an authorised controlling trusted party can update or change the firmware of the authentication device. This enables the controlling trusted party to ensure that no firmware update happens which would undo the authentication device's dedication to its use in methods to secure a user's access to an application or to secure a user's interaction with such an application. Devices where the users can install extra software that is not authorized by a controlling trusted party cannot be considered dedicated devices. Devices the main purpose of which is to offer telecommunication facilities cannot be considered devices dedicated to be used in methods to secure a user's access to and interaction with an application. General purpose PCs, laptops, tablet computers and smartphones cannot be considered dedicated devices.

Software tokens on a non-dedicated personal computing device

In some embodiments the authentication device (100) comprises a hardware device (100) that is not dedicated to performing authentication functions and generating dynamic credentials as described elsewhere is this application. In some embodiments the hardware device may comprise a personal user device or personal computing device (100) that also offers other functionality besides authentication functionality and generating dynamic credentials. For example, in some embodiments the personal computing device may also offer telecommunication services such as making phone calls or browsing the internet or sending and receiving emails. In some embodiments the personal computing device may offer other functionality such as taking pictures or making movies with a camera comprised in the personal computing device. In some embodiments the personal computing device may comprise an operating system which may allow the user to install extra applications or apps to enrich the functionality of the personal computing device. In some embodiments the possibility to install extra application or apps is not controlled or doesn't need to be authorized by a controlling trusted third party. In some embodiments the possibility to install extra application or apps may be controlled by a centralised controlling party (for example a party associated with the provider or manufacturer of the personal computing device) but the centralised controlling party is not or doesn't need to be trusted by the remote application. In some embodiments the personal computing device may comprise an authentication application or app for generating dynamic credentials as described elsewhere in this description. In some embodiments the authentication application or app is not be default present on the personal computing device but must be installed on the personal computing device after the personal computing device has been distributed to the user. In some embodiments the installation on the personal computing device of the authentication application or app may be initiated by a user action on the personal computing device. In some embodiments the authentication application or app may be automatically pushed to the personal computing device without requiring a prior user action on the personal computing device. In some embodiments such push of an authentication application or app can be done by the provider of the authentication application or app. In some embodiments the push can be done by an application owner of a remote application, access to which by the user will be secured by the authentication application or app. In some embodiments the personal computing device may comprise the executable code of an authentication application or app by default when the personal computing device is provided to the user, but the authentication application or app may still require provisioning of personalization data such as configuration data and/or secret data such as cryptographic keys and/or password or PIN values and/or biometric templates related to the user. In some embodiments the personal computing device may comprise for example a smartphone or a tablet.

Figure 3:
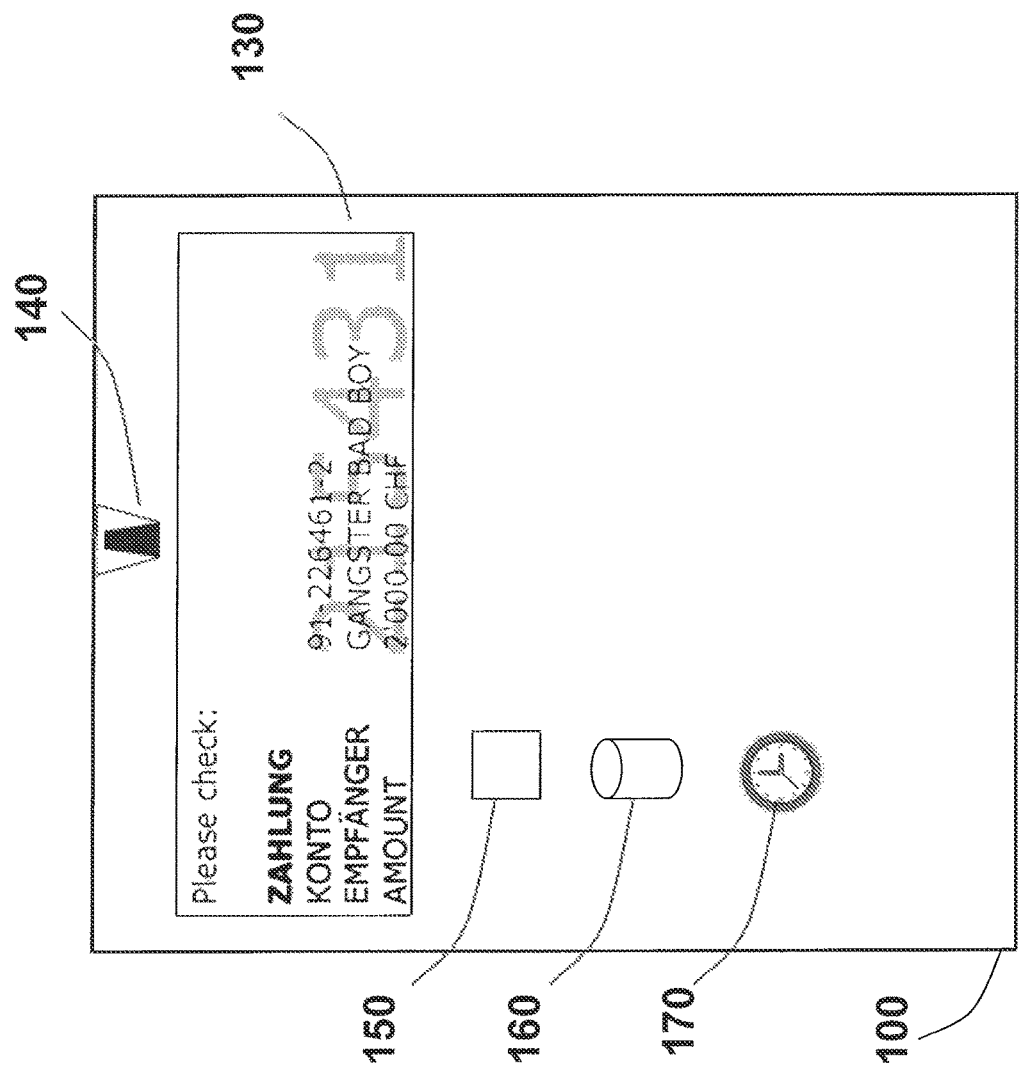
FIG. 3 schematically illustrates an exemplary apparatus according to an aspect of the invention.

FIG. 3 schematically illustrates an exemplary apparatus according to an aspect of the invention.

The authentication device (100) may for example comprise one of the authentication devices described elsewhere in this description such as for example one of the authentication devices described in connection to FIG. 1.

The authentication device may be running an authentication application. The authentication application may be adapted to thwart possible overlay attacks by visually intertwining the function of presenting the transaction data with the visual aspects of other functionality of the authentication application which must be accessible or visible to the user for the user to be able to obtain a dynamic credential or for the authentication application to generate and/or provide a dynamic credential to the user or to some destination such as a remote verification server. In the illustrated embodiment, the dynamic credential ("215431") is presented such that it overlaps with the transactions data.

For example, the authentication application may generate a dynamic credential corresponding to the transaction data and display the generated credential at the same time together with the corresponding transaction data. If, upon reviewing the displayed transaction data, the user approves of the displayed transaction data, the user may forward the corresponding displayed dynamic credential to the remote application. If the authentication application were to display the dynamic credential and the transaction data in disjoint non-overlapping areas of the display, then it would be relatively easy for an overlay attack to overlay the transaction data that the dynamic credential corresponds to with other transaction data that the overlay attack wants the user to see instead. However, in accordance with an aspect of the invention, if the authentication application intertwines the presentation of the transaction data and the presentation of the corresponding dynamic credential e.g. by using the same area of the display for displaying both the transaction data and the corresponding dynamic credential in an overlapping manner, then an overlay attack that overlays and hides the transaction data displayed by the authentication application would automatically also overlay and hide the dynamic credential. Since the user in that case cannot see the dynamic credential, the user cannot copy and forward to the remote application the dynamic credential generated and displayed by the authentication application. Since the remote application doesn't receive the dynamic credential it may not accept the transaction corresponding to this dynamic credential, thus frustrating the overlay attacker's attempt to enter a fraudulent transaction.

In the example illustrated by FIG. 3 a man-in-the-middle attacker has manipulated the transaction data that the user wanted to submit to a remote application such as for example an internet banking web site. For example, the attacker may have substituted the original user's transaction data with fraudulent transaction data e.g. by replacing the original values of the account number (indicated by "KONTO" in FIG. 3) and of the destination identifier number (indicated by "EMPFÄNGER" in FIG. 3) that were provided by the user with the account number ("91-226461-2") and destination identifier ("GANGSTER BAD BOY") of the attacker. The remote application and the user initially may be unaware of this substitution. The remote application may send the received (fraudulent) transaction data to the user's authentication device for review and approval. The authentication device receives the (fraudulent) transaction data, generates a corresponding dynamic credential ("215431") and displays both the received (fraudulent) transaction data and the corresponding generated dynamic credential. The idea is that the user reviews the displayed transaction data and, if the user approves these displayed transaction data, copies and forwards the displayed dynamic credential to the remote application. In this case the user would, upon reviewing the displayed (fraudulent) transaction data, understand that something went seriously wrong because the displayed transaction data don't match the original transaction data supplied by the user and, thus, the user would not forward the displayed dynamic credential. To circumvent this review control, the attacker could try to mount an overlay attack by hiding the fraudulent transaction data, which the authentication application received and is displaying, with an overlay window that displays the original transaction data that the user tried to provide to the remote application. However, since in this embodiment the authentication application is displaying the transaction data and the corresponding dynamic credential such that they are superimposed, any overlay window hiding the transaction data displayed by the authentication application would inevitably also hide the corresponding dynamic credential also displayed by the authentication application in exactly the same area of the display (130) as the transaction data. This would not only provide an unambiguous visual clue to the user that something is very wrong, it would also make it impossible for the user (even if the user were to ignore this clue) to see and obtain the dynamic credential and thus it would be impossible for the user to forward to the remote application the dynamic credential corresponding to the fraudulent transaction data. Upon not receiving a valid corresponding dynamic credential, the remote application may refuse the (fraudulent) transaction data thus frustrating the attacker's attempt to enter a fraudulent transaction.

Figure 2:
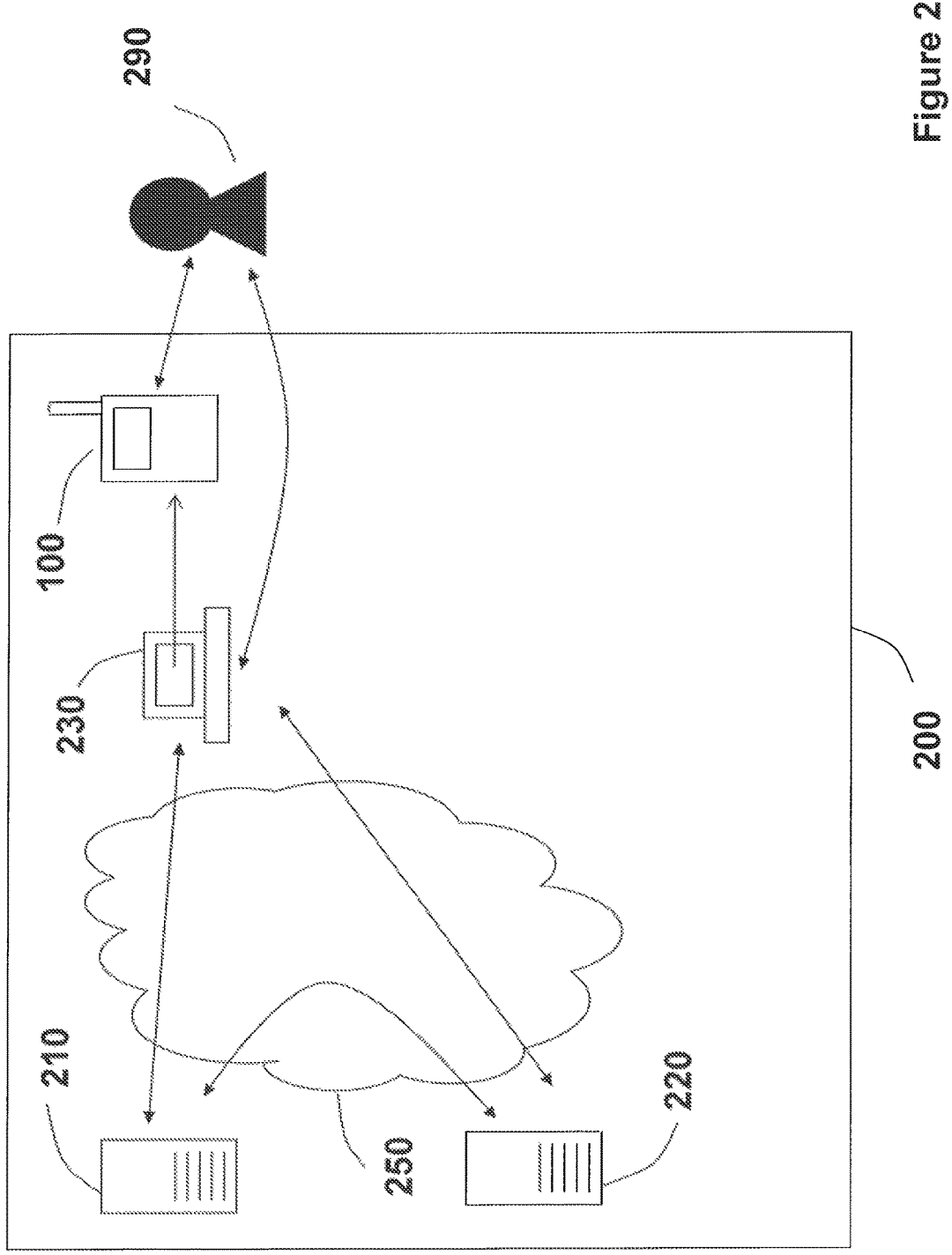
FIG. 2 schematically illustrates an exemplary system according to an aspect of the invention.

FIG. 2 schematically illustrates an exemplary system according to an aspect of the invention.

In one embodiment a system (200) according to the invention may comprise the following components:

One or more remote application server computers (210). The one or more remote application server computers (210) may host one or more remote applications which may be remotely accessible by one or more users of a plurality of users (290). A remote application server computer (210) may for example comprise a web server. The one or more remote applications may be under control of one or more application providers.

A plurality of client computing devices (230) that may allow one or more users of the plurality of users (290) to remotely access the one or more remote applications and hence may also be referred to as access devices. A client computing device or access device (230) may for example comprise a PC (personal computer), a laptop or a tablet computer.

A computer network (250) that connects the one or more application server computers (210) and the plurality of client computing devices or access devices (230). In some embodiments the computer network (210) may comprise the internet. In some embodiments the computer network (210) may comprise a public telephone network. In some embodiments the computer network (210) may comprise a wireless telephony network.

A plurality of authentication devices (100) as described in more detail elsewhere in this description, for example in connection to FIG. 1. The authentication devices (100) may be distributed among the plurality of users. In some embodiments the authentication devices (100) may be distributed among the users by the one or more application providers. In some embodiments the authentication devices (100) may be consumer electronic apparatus which may comprise an authentication application which may be adapted as described elsewhere in this description. In some embodiments the authentication devices (100) may comprise a personal computing device such as for example a smartphone or a tablet computer. In some embodiments the authentication devices (100) may comprise an operating system such as for example Android or iOS. In some embodiments the authentication application may comprise a smartphone app or tablet app. In some embodiments users (290) may obtain the authentication application from a provider and install the authentication application on a device (100) of their choice. In some embodiments users (290) may obtain the authentication application from an app store.

One or more credential verification servers (220). In some embodiments each of the one or more credential verification servers (220) is connected to at least one of the one or more application servers (210) and may be configured to verify dynamic credentials that a remote application hosted by the one or more application servers (210) connected to the verification server may receive from users (290) interacting with such remote application. In some embodiments each of the application servers (210) may be connected to at least one of the one or more credential verification servers (220)

and may be configured to forward to one of the connected one or more credential verification servers (220) dynamic credentials received by a remote application hosted by the application server (210) from a user (290) interacting with the remote application. Upon receiving a dynamic credential from a remote application, a credential verification server may retrieve data associated with the user and/or the authentication device (100) by which the dynamic credential has been generated and use that data to cryptographically verify the validity of the received dynamic credential. For example, in some embodiments the credential verification server may generate a reference value for the dynamic credential and compare the generated reference value with the received dynamic credential and consider the verification of the received dynamic credential successful if the received dynamic credential matches the generated reference value. In some embodiments the credential verification server may generate the reference value by applying a cryptographic algorithm to reference input data such as transaction data that the server may have received and/or the value of a server copy of a counter variable or event-related variable associated with the user and/or a time value. In some embodiments the credential verification server may parameterize this cryptographic algorithm with a cryptographic key which may comprise or which may be derived from a secret value associated with the user. The credential verification server (220) may return a signal to the remote application to indicate whether the verification was successful. If the signal indicates that the verification was successful, the remote application may use that information in deciding whether or not to grant access to the user or whether or not to perform a certain operation requested by the user (such as performing a transaction submitted by the user).

Figure 4:
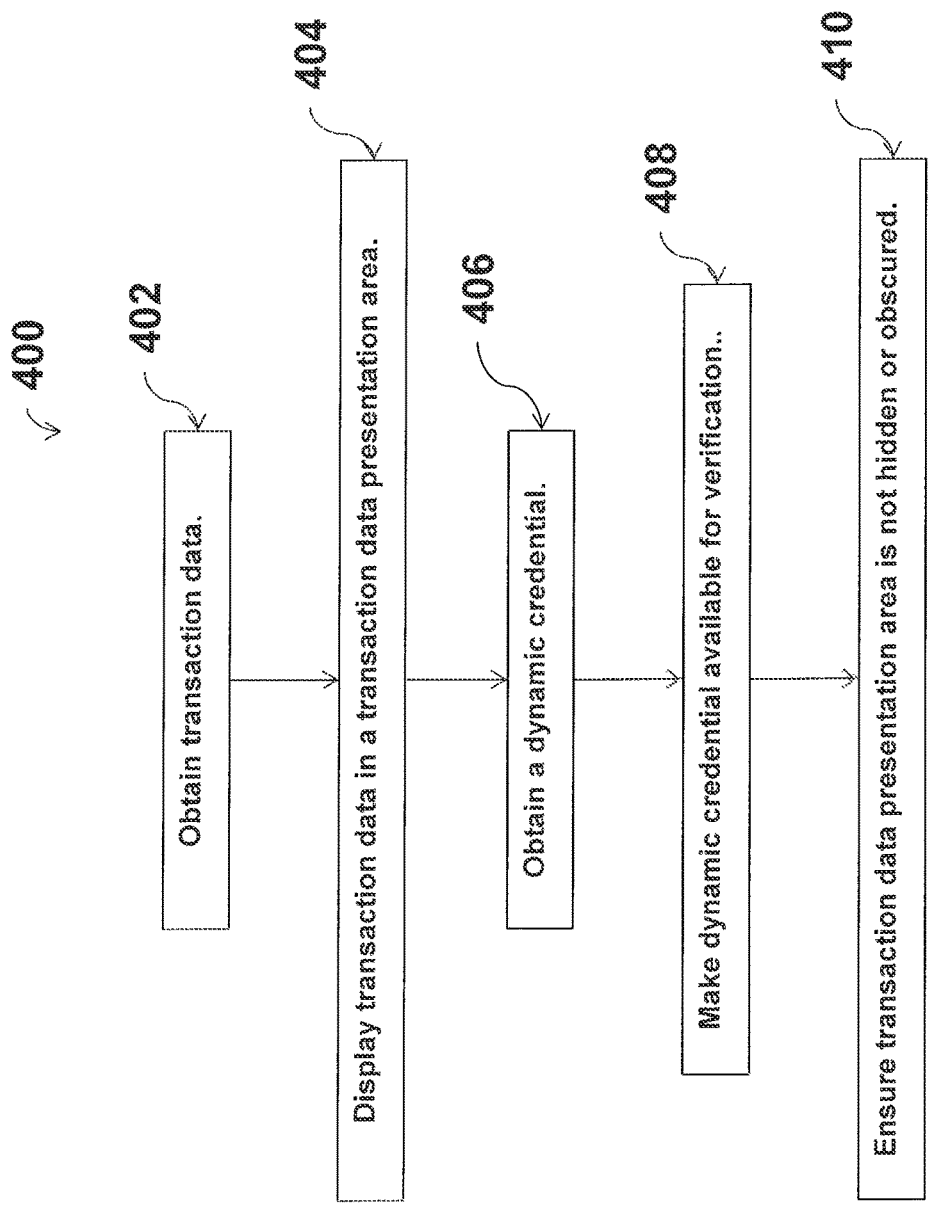
FIG. 4 schematically illustrates an exemplary method according to an aspect of the invention.

FIG. 4 schematically illustrates a method (400) to secure a user's interaction with a remotely accessible computer-based application. The method may comprise the steps of performing at a personal computing device the steps of: obtaining (402) transaction data; displaying (404) the obtained transaction data on a display of the personal computing device for review by the user, wherein an authentication application that is running on the personal computing device displays the obtained transaction data in a transaction data presentation area of the display of the personal computing device; obtaining (406) a dynamic credential associated with the transaction data; making (408) the dynamic credential available for verification; and ensuring (410) at the personal computing device that no window of another application that is running on the personal computing device can partially or entirely hide or obscure the authentication application's transaction data presentation area.

Figure 5:
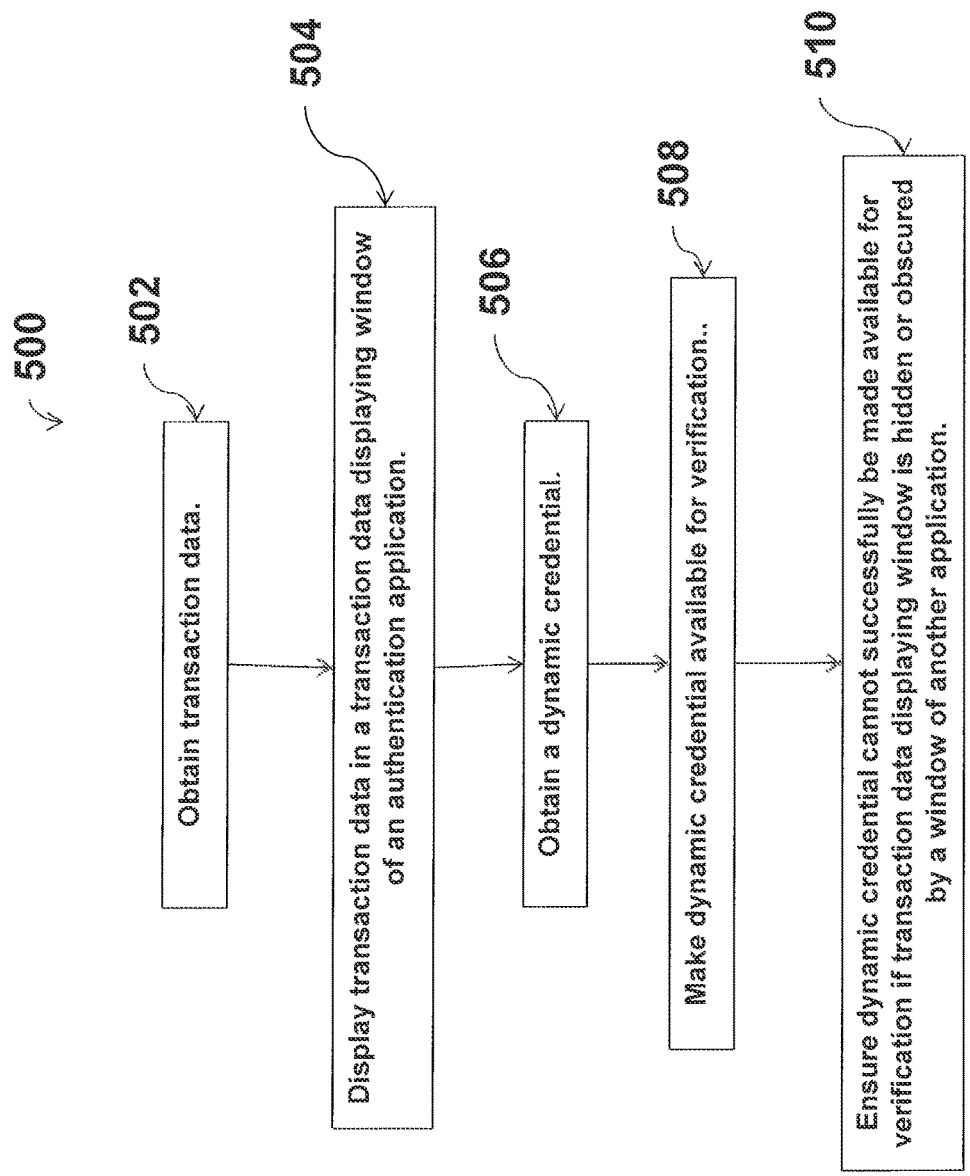
FIG. 5 schematically illustrates another exemplary method according to an aspect of the invention.

FIG. 5 schematically illustrates a method (500) to secure a user's interaction with a remotely accessible computer-based application. The method may comprise performing at a personal computing device the steps of: obtaining (502) transaction data; displaying (504), by an authentication application running on the personal computing device, the obtained transaction data in a transaction data displaying window of the authentication application on a display of the personal computing device for review by the user; obtaining (506) a dynamic credential associated with the transaction data; making (508) the dynamic credential available for verification; and ensuring (510) that at least the step of making the dynamic credential available for verification is not performed or cannot be successfully performed if the authentication application's transaction data presentation area or the authentication application's transaction data displaying window is being hidden or obscured partially or entirely by a window that is not a window of the authentication application.

Figure 6:
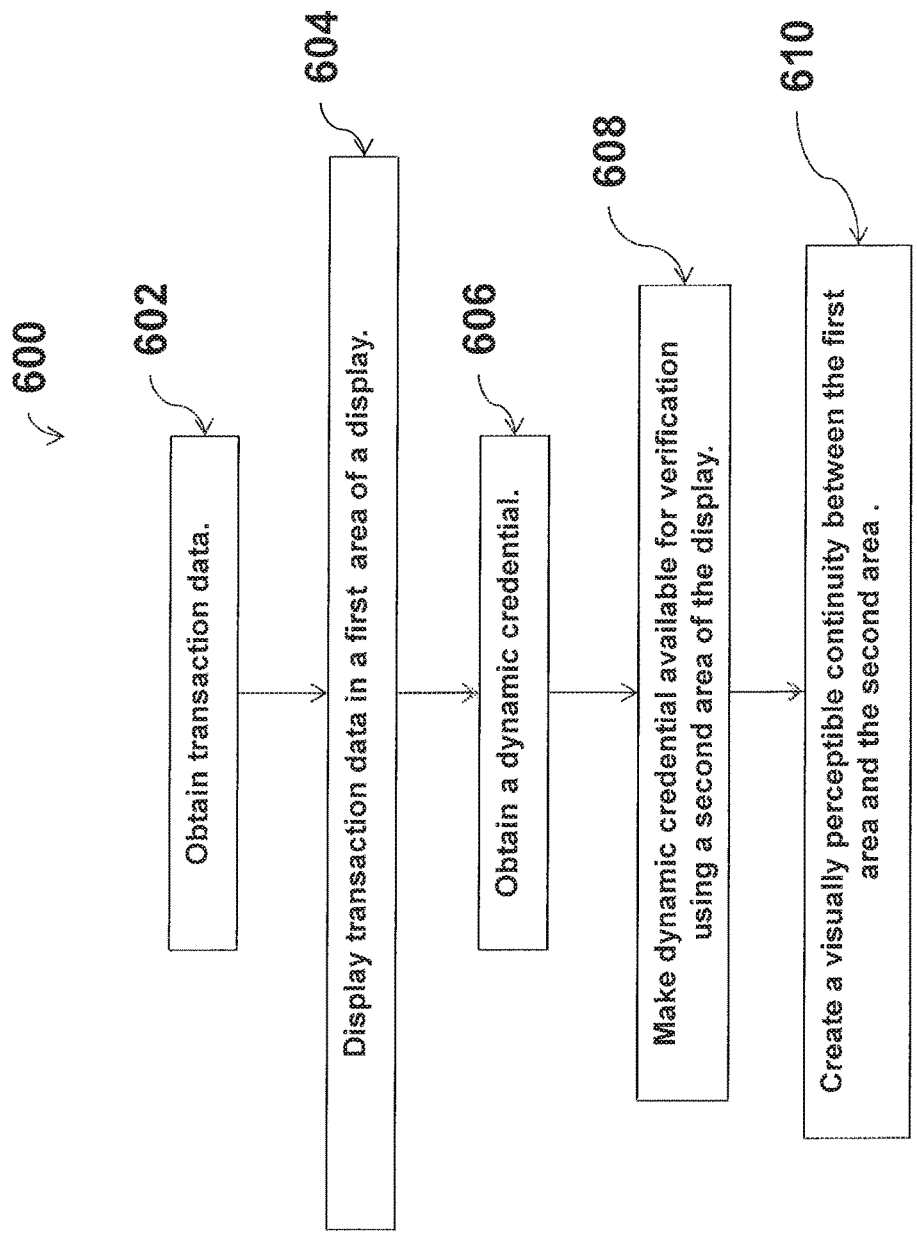
FIG. 6 schematically illustrates yet another exemplary method according to an aspect of the invention.

FIG. 6 schematically illustrates a method (600) to secure an interaction session of a user with a remotely accessible computer-based application. The method may comprise performing at a personal computing device the steps of: obtaining (602) transaction data related to said interaction session; displaying (604), by an authentication application running on the personal computing device, the obtained transaction data on a first area of a display of the personal computing device for review by the user; obtaining (606) a dynamic credential associated with the transaction data; making (608), by the authentication application, the dynamic credential available for verification using a second area of the display of the personal computing device; and creating (610) a visually perceptible continuity between the first area and the second area by giving a first visually perceptible element of the first area and a second visually perceptible element of the second area the same common specific value, such that the presence of an overlay window that is not a window of the authentication application and that partially or entirely hides or obscures the first area and that doesn't have a third visually perceptible element with the same value as said common specific value for said first and second visually perceptible elements causes a visually perceptible discontinuity between the overlay window and the second area alerting the user to the presence of said overlay window.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments; rather the scope of at least one embodiment of the invention is defined only in accordance with the following claims and their equivalents.

The invention claimed is:

1. A method to secure a user's interaction with a remotely accessible computer-based application, the method comprising performing at a personal computing device the steps of:
   obtaining transaction data;
   displaying, by an authentication application running on the personal computing device, the obtained transaction data in a transaction data presentation area of the authentication application on a display of the personal computing device for review by the user;
   obtaining a dynamic credential associated with the transaction data;
   making the dynamic credential available for verification;

ensuring that at least the step of making the dynamic credential available for verification is not performed or cannot be successfully performed if the authentication application's transaction data presentation area is being hidden or obscured partially or entirely by another window that is not displayed by the authentication application;

providing, while performing the step of displaying the obtained transaction data, an approval indication mechanism for the user to indicate an approval or rejection by the user and obtaining by using this mechanism from the user an indication of the user's approval or rejection, wherein performing at least the step of making the dynamic credential available for verification is conditional on the authentication application receiving through said approval indication mechanism the indication of the user's approval; and ensuring that the approval indication mechanism is disabled if the authentication application's transaction data presentation area is being hidden or obscured partially or entirely by the another window.

2. The method of claim 1, wherein at least the step of making the dynamic credential available for verification is not performed or cannot be successfully performed at least as long as the authentication application's transaction data presentation area is being hidden or obscured partially or entirely by a window that is not a window of the authentication application.

3. The method of claim 1, wherein the step of ensuring that the approval indication mechanism is disabled if the authentication application's transaction data presentation area is being hidden or obscured partially or entirely by the another window comprises the authentication application calling one or more operating system functions that cause the operating system of the personal computing device to block or not pass to the approval indication mechanism a user input event that indicates a user's approval when the authentication application's transaction data presentation area is being hidden or obscured partially or entirely by the another window.

4. The method of claim 1, further comprising an overlay detection step of the authentication application detecting or verifying whether the authentication application's transaction data presentation area is being hidden or obscured partially or entirely by the another window.

5. The method of claim 4, wherein the overlay detection step comprises the authentication application calling one or more operating system functions of the operating system of the personal computing device to detect whether the authentication application's transaction data presentation area is being hidden or obscured partially or entirely by the another window.

6. The method of claim 1, comprising an overlay detection step of the authentication application detecting or verifying whether the authentication application's transaction data presentation area is being hidden or obscured partially or entirely by the another window and the step of ignoring an indication of the user's approval that has been obtained by the approval indication mechanism if it is detected in the overlay detection step that the authentication application's transaction data presentation area is being hidden or obscured partially or entirely by the another window.

7. The method of claim 4, wherein performing the step of making the dynamic credential available for verification is conditional on the overlay detection step not indicating that the authentication application's transaction data presentation area is being hidden or obscured partially or entirely by the another window.

8. The method of claim 4, further comprising the step of providing the user a visual indication for alerting the user to the presence of an anomaly if the overlay detection step indicates that the authentication application's transaction data presentation area is being hidden or obscured partially or entirely by the another window.

9. The method of claim 4, further comprising the step of the authentication application entering a safe mode if the overlay detection step indicates that the authentication application's transaction data presentation area is being hidden or obscured partially or entirely by the another window, and the authentication application remaining in the safe mode at least until after the authentication application's transaction data presentation area is no longer being hidden or obscured partially or entirely by the another window for at least a minimum period of time.

10. The method of claim 9, wherein as long as the authentication application is in the safe mode, the approval indication mechanism is disabled, or an indication of the user's approval that has been obtained by the approval indication mechanism is ignored, or the step of generating the dynamic credential is not performed, or the step of making the dynamic credential available for verification is not performed; or
wherein as long as the authentication application is in the safe mode, the authentication application provides a visual indication to alert the user that the authentication application is in the safe mode.

11. The method of claim 1, wherein the approval indication mechanism comprises a visual approval activation element on the display of the personal computing device that the user must activate to indicate the user's approval whereby the visual approval activation element has an activation area that is responsive to an action of the user and whereby an area of the display that is covered by the activation area of the visual approval activation element overlaps at least partially with any rectangle on the display that covers all the displayed transaction data.

12. The method of claim 11, whereby at least any part of the activation area of the visual approval activation element that is covered by the another window is not responsive to an action of the user to activate the visual approval activation element; or
whereby at least a part of the displayed transaction data is displayed over the activation area of the visual approval activation element; or
whereby at least parts of the displayed transaction data are displayed at at least two positions of: left of, right of, above of or below of the activation area of the visual approval activation element.

13. The method of claim 11, wherein the user activating the visual approval activation element comprises the user clicking or touching or sliding the activation area of the visual approval activation element.

14. The method of claim 13, whereby the visual approval activation element comprises a clickable or touchable button.

15. The method of claim 11, wherein the step of making the dynamic credential available for verification comprises displaying the dynamic credential on the display of the personal computing device whereby the activation area of the visual approval activation element is covered by the displayed transaction data and whereby the area for displaying the dynamic credential is covered by the area for displaying the transaction data, and whereby the dynamic credential is not visible until the user has activated the visual approval activation element.

16. The method of claim 15, whereby activating the visual approval activation element comprises the user touching and sliding at least a part of the visual approval activation element thus sliding away at least a part of the displayed transaction data and revealing a representation of the dynamic credential; or wherein activating the visual approval activation element comprises the user touching and sliding in different directions at least two parts of the visual approval activation element thus sliding away at least a part of the displayed transaction data and revealing a representation of the dynamic credential.

17. The method of claim 16, whereby the user releasing the visual approval activation element results in the displayed transaction data snapping back to the original position and the displayed dynamic credential being no longer visible.

18. The method of claim 1, wherein the step of making the dynamic credential available for verification comprises displaying the dynamic credential on the display of the personal computing device together with the displayed transaction data, whereby the dynamic credential is displayed at the same time and in the same area of the display as the displayed transaction data, such that any rectangle which encloses all the displayed transaction data also encloses at least a part of the displayed dynamic credential.

19. The method of claim 18, whereby the transaction data and the dynamic credential are displayed in an overlapping way or stacked on top of each other; or
whereby the dynamic credential is displayed surrounded by the displayed transaction data.

20. The method of claim 18, wherein a representation of the dynamic credential and a representation of the transaction data on the display have different visual characteristics to enable the user to distinguish the dynamic credential from the transaction data.

21. The method of claim 1, wherein the step of obtaining the dynamic credential associated with the transaction data comprises generating the dynamic credential by cryptographically combining the transaction data with a cryptographic key that comprises or is derived from a secret stored in the personal computing device.

22. A personal computing device to secure a user's interaction with a remotely accessible computer-based application, the personal computing device comprising a display for displaying information to the user, a user input interface for receiving inputs from the user, a memory component storing an operating system software and an authentication application software, and a data processing component for running the operating system software and the authentication application; wherein the authentication application is configured to cause the personal computing device to:
obtain transaction data;
display the obtained transaction data in a transaction data presentation area of the authentication application on the display for review by the user;
obtain a dynamic credential associated with the transaction data;
make the dynamic credential available for verification;
ensure that at least the step of making the dynamic credential available for verification is not performed or cannot be successfully performed if the authentication application's transaction data presentation area is being hidden or obscured partially or entirely by another window that is not displayed by the authentication application; and
provide, while displaying the obtained transaction data, an approval indication mechanism for the user to indicate an approval or rejection by the user and obtain by using this mechanism from the user an indication of the user's approval or rejection, wherein making the dynamic credential available for verification is conditional on the authentication application receiving through said approval indication mechanism the indication of the user's approval; and wherein the approval indication mechanism is disabled if the authentication application's transaction data presentation area is being hidden or obscured partially or entirely by the another window.

23. A system to secure a user's interaction with a remotely accessible computer-based application, the system comprising: a remote application server for hosting the remotely accessible computer-based application, an access device for allowing said user's interaction with a remotely accessible computer-based application, a credential verification server for verifying the validity of a dynamic credential associated with transaction data of the remotely accessible computer-based application, and a personal computing device comprising a display for displaying information to the user, a user input interface for receiving inputs from the user, a memory component storing an operating system software and an authentication application software, and a data processing component for running the operating system software and the authentication application; wherein the authentication application is configured to cause the personal computing device to:
obtain the transaction data;
display the obtained transaction data in a transaction data presentation area of the authentication application on the display of the personal computing device for review by the user;
obtain the dynamic credential associated with the transaction data;
make the dynamic credential available for verification; and
ensure that at least the step of making the dynamic credential available for verification is not performed or cannot be successfully performed if the authentication application's transaction data presentation area is being hidden or obscured partially or entirely by another window that is not displayed by the authentication application;
provide, while displaying the obtained transaction data, an approval indication mechanism for the user to indicate an approval or rejection by the user and obtain by using this mechanism from the user an indication of the user's approval or rejection, wherein performing at least the step of making the dynamic credential available for verification is conditional on the authentication application receiving through said approval indication mechanism the indication of the user's approval; and wherein the approval indication mechanism is disabled if the authentication application's transaction data presentation area is being hidden or obscured partially or entirely by the another window.

* * * * *